(12) United States Patent
Weyl et al.

(10) Patent No.: US 9,754,272 B2
(45) Date of Patent: Sep. 5, 2017

(54) SYSTEM AND METHOD FOR QUADRATIC, NEAR-QUADRATIC, AND CONVEX VOTING IN VARIOUS TYPES OF RESEARCH AND VOTING

(71) Applicant: Collective Decision Engines, Inc., Jackson Heights, NY (US)

(72) Inventors: E Glen Weyl, Boston, MA (US); David Quarfoot, San Diego, CA (US); Eric Posner, Chicago, IL (US); Kevin Slavin, Brooklyn, NY (US)

(73) Assignee: Collective Decision Engines, Inc., Jackson Heights, NY (US)

( * ) Notice: Subject to any disclaimer, the term of this patent is extended or adjusted under 35 U.S.C. 154(b) by 0 days.

(21) Appl. No.: 15/190,116

(22) Filed: Jun. 22, 2016

(65) Prior Publication Data

US 2016/0292947 A1    Oct. 6, 2016

Related U.S. Application Data

(63) Continuation of application No. 15/069,894, filed on Mar. 14, 2016, now abandoned.

(60) Provisional application No. 62/133,291, filed on Mar. 13, 2015.

(51) Int. Cl.
*G07C 13/00* (2006.01)
*G06Q 30/02* (2012.01)

(52) U.S. Cl.
CPC ..... *G06Q 30/0201* (2013.01); *G06Q 2230/00* (2013.04)

(58) Field of Classification Search
USPC .................................................. 235/375–384
See application file for complete search history.

(56) References Cited

U.S. PATENT DOCUMENTS

| | | | |
|---|---|---|---|
| 6,947,966 | B1 | 9/2005 | Oko, Jr. et al. |
| 7,744,461 | B2 | 6/2010 | Keser et al. |
| 8,494,436 | B2 | 7/2013 | Morgia et al. |
| 2004/0194110 | A1 | 9/2004 | McKee et al. |
| 2012/0244937 | A1 | 9/2012 | Patnaik et al. |
| 2015/0039404 | A1 | 2/2015 | Richardson |

*Primary Examiner* — Jamara Franklin
(74) *Attorney, Agent, or Firm* — Galvin Patent Law LLC; Brian R. Galvin

(57) ABSTRACT

A method for eliciting and aggregating truthful preferences of respondents, with steps of assigning a currency budget to a respondent and generating a user interface. The user interface: displays budgets for each respondent; displays choices among alternative outcomes for each respondent and a method for allocating votes among options by paying according to a quadratic function; displays the outcome of the voting for each respondent; enables a third party to select and contact respondents; enables the third party to observe voting choices and final voting outcomes; and enables the third party to control budgets and voting options.

10 Claims, 28 Drawing Sheets

Sensory - sound-based
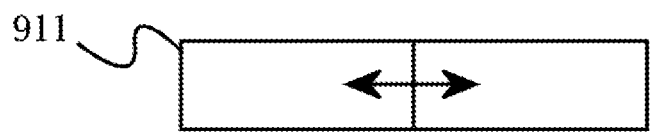
Slider on currency usage
 Applause level
(or "boo" level)
mapped quadratically
to currency usage
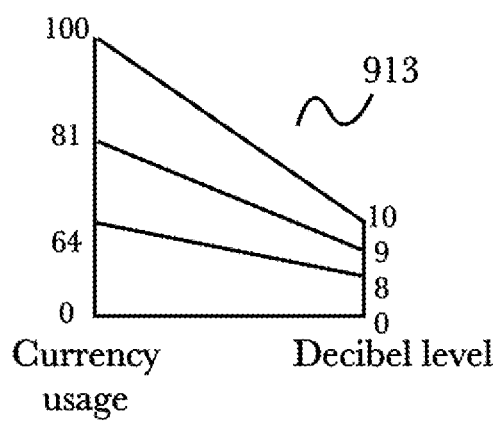
Fig. 9B

| Dashboard | Create | Help | Log Out | | |
|---|---|---|---|---|---|
| Pending | Active | Completed | | | Actions |
| ID | Title | Votes | End | | |
| 123 | Survey #001 | 300 | 01/19/15 | | |
| 124 | Survey #002 | 105 | 01/19/15 | | |
| ⋮ | ⋮ | ⋮ | ⋮ | | |
| 180 | Survey #n | 765 | 01/19/15 | | |

Fig. 16

| | Dashboard | Create | Help | Log Out |
|---|---|---|---|---|
| Pending | Active | | Completed | |
| ID | Title | Votes | End | Actions |
| 123 | Survey #001 | 300 | 01/19/15 | |
| | Avg Time: 2.53 mins  \|  Sent to: 32353 participants  \|  Goal: 25400 Answers | | | |
| 124 | Survey #002 | 105 | 01/19/15 | |
| | ⋮ | | | |
| 180 | Survey #n | 765 | 01/19/15 | |

Fig. 17

SYSTEM AND METHOD FOR QUADRATIC, NEAR-QUADRATIC, AND CONVEX VOTING IN VARIOUS TYPES OF RESEARCH AND VOTING

CROSS-REFERENCE TO RELATED APPLICATIONS

This application is a continuation of U.S. application Ser. No. 15/069,894, titled "System and Method for Quadratic, Near-Quadratic, and Convex Voting in Various Types of Research and Voting", and filed on Mar. 14, 2016, which claims the benefit of, and priority to, 62/133,291, titled "System and Method for Quadratic, Near-Quadratic, and Convex Voting in Various Types of Research and Voting" and filed on Mar. 13, 2015, the entire specifications of each of which are incorporated herein by reference in their entirety.

BACKGROUND OF THE INVENTION

Field of the Art

The disclosure relates to the field of electronic voting, and more particularly to the field of collaborative decision-making by groups of people using voting.

Discussion of the State of the Art

Voting is a common method for aggregating the preferences of a group of people, or the private information of a group of people, in order to produce a collective decision that will affect the entire group. There are numerous types of voting systems; they are most familiar from politics, but voting systems are also used in numerous private organizations, including clubs, universities, and corporations (shareholder voting, voting by boards of directors, voting in teams of employees, etc.). A type of voting is also used in market research, where customers or respondents may be asked to express their preferences about products and services. However, all of these voting systems share a significant flaw. They do not provide respondents the proper means or incentives for expressing the intensity of their preferences.

As a result, voting systems exhibit a wide range of well-known pathologies. Often people with weak preferences can outvote people with strong preferences (known as "tyranny of the majority"). People vote inconsistently, and often become frustrated and give little attention to their choices. For these and other reasons, voting systems frequently produce inaccurate outcomes, which lead to poor decisions by institutions that rely on them.

What is needed, therefore, is a system and various methods for convex or quadratic, or near-quadratic voting in various types of research and voting.

SUMMARY OF THE INVENTION

Accordingly, the inventor has conceived and reduced to practice, in a preferred embodiment of the invention, a system and various methods for convex or quadratic, or near-quadratic voting in various types of research and voting.

The Quadratic Voting (QV) and related systems provide a method for eliciting and aggregating the preferences of a group of people. For example, a team of engineers in a corporation, a university faculty, an honors society, or members of a residential co-op can use the QV system to make collective decisions. Market research firms can use the QV system to determine the preferences and opinions of customers, potential customers, and survey respondents.

In the QV and related systems, respondents are given access to web pages where they spend budgets of real or artificial currency for or against options that they are provided with. They pay for votes according to a quadratic function: to buy n votes for or against an option, they must pay the square of n in currency units. The votes are aggregated and the results are communicated to a third party who manages the system.

The user interface includes elements that help the respondent comprehend the quadratic function, including visual depictions of knobs, cords, springs, dials, funnels, and other devices that exert greater resistance as the user increases the number of votes, with the resistance increasing at a quadratic rate, or that visually show the user how currency units translate into votes.

The system generates accurate information about the users, including their individual and collective preferences over the choices, and the intensities of those preferences. The system records every click of the users, and computes statistics that reveal how deeply users deliberated about different options, among other information.

This summary is provided to introduce a selection of concepts in a simplified form that is further described below in the detailed description. This summary is not intended to identify key features or essential features of the claimed subject matter, nor is it intended to be used to limit the scope of the claimed subject matter.

According to a preferred embodiment of the invention, system for eliciting and aggregating the truthful preferences of a group of respondents is disclosed, comprising: a server computer comprising a memory, a processor, and a plurality of programming instructions stored in the memory and operating on the processor, the plurality of programming instructions comprising at least a quadratic voting software component. The quadratic voting software component is configured to: provide an administrative user interface for assigning a budget of artificial or real currency to a first respondent of the group of respondents; provide a respondent user interface that: displays a set of choices among alternative outcomes for the first respondent and a method for allocating votes among the choices by paying with the budget according to a quadratic function; and displays an outcome of the voting for the first respondent; enable a third party to select a subset of the plurality of respondents and to contact the subset of respondents by email, text message, or other communication method with a link to a web page; enable the third party to observe voting choices made by respondents and final voting outcomes; and enable the third party to act via the administrative user interface.

According to a further embodiment of the invention, near-quadratic or convex cost of voting may be used, where: a near-quadratic cost of voting is a Taylor polynomial of a cost-vote relationship with small coefficients on all degree 3 and higher terms, and a convex cost of voting is a cost with a linear or close to linear derivative. In a further embodiment, the quadratic-voting software component is further configured to: record every click that the first respondent makes while allocating currency to votes and revising decisions; generate aggregate statistics using the recorded click data; and reveal a set of choices that receive the most deliberation, and a strength of preference for various choices. According yet another embodiment, the respondent user interface comprises one or more of: a visual depiction of a device such as a slider, knob, spring, cord, or the like, which may be moved by touching a screen, wherein the device exhibits greater resistance according to a quadratic function as a user uses it to register a greater number of votes; an acoustic component that emits a noise an acoustic volume of which varies according to a quadratic function as a greater number of votes are registered by the user; and a visual depiction of a funnel, wherein a volume of liquid within the funnel represents units of currency and a height of a visual liquid level in the funnel represents a number of votes, wherein the funnel is shaped so that a quadratic relationship between votes cast and currency units is maintained. Another embodiment of the invention discloses that the quadratic-voting software component is further configured to: generate a user interface that: enables the first respondent to communicate a proposal to other respondents by placing currency in an escrow account; and allows other respondents to endorse the proposal by placing currency in the escrow account; and adds the proposal as an alternative option to be voted on by respondents if currency placed in escrow exceeds a threshold level.

According to another preferred embodiment of the invention, a method for eliciting and aggregating the truthful preferences of a group of respondents, the method comprising the steps of: assigning, using a quadratic voting software component comprising programming instructions stored in a memory of, and operating on a processor of, a server computer comprising a memory and a processor, a budget of artificial or real currency to a respondent of the group of respondents; and providing, using the quadratic voting software component, an administrative user interface for assigning a budget of artificial or real currency to a first respondent of the group of respondents; providing, using the quadratic voting software component, a respondent user interface that: displays a set of choices among alternative outcomes for the first respondent and a method for allocating votes among the choices by paying with the budget according to a quadratic function; and displays an outcome of the voting for the first respondent; enabling, using the quadratic voting software component, a third party to select a subset of the plurality of respondents and to contact the subset of respondents by email, text message, or other communication method with a link to a web page; enabling, using the quadratic voting software component, the third party to observe voting choices made by respondents and final voting outcomes; and enabling, using the quadratic voting software component, the third party to act via the administrative user interface.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 9b shows exemplary sound-based sensory interactions to increase and decrease vote quantities, according to one aspect of the system and method disclosed herein.

FIG. 16 shows an exemplary screen in which an administrator has an overview of the status of existing surveys and from which an administrator can create surveys, according to one aspect of the system and method disclosed herein.

FIG. 17 shows an exemplary administrative screen, according to one aspect of the system and method disclosed herein.

FIGS. 26*a-e* show exemplary voting windows, according to one aspect of the invention.

Figure 27:
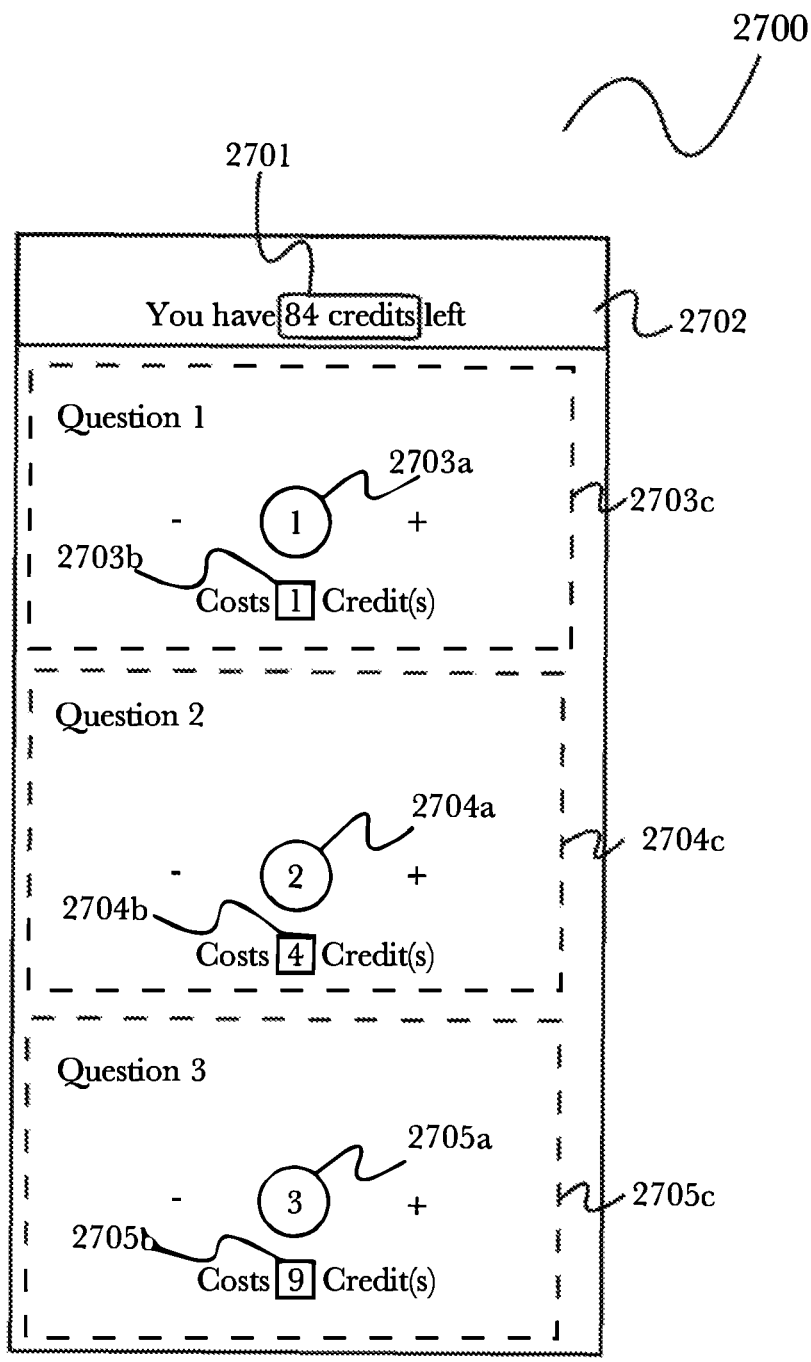

FIG. 27 shows an exemplary voting screen, according to an embodiment of the invention.

DETAILED DESCRIPTION

The inventor has conceived, and reduced to practice, in a preferred embodiment of the invention, a system and various methods for convex or quadratic, or near-quadratic voting in various types of research and voting.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 22:
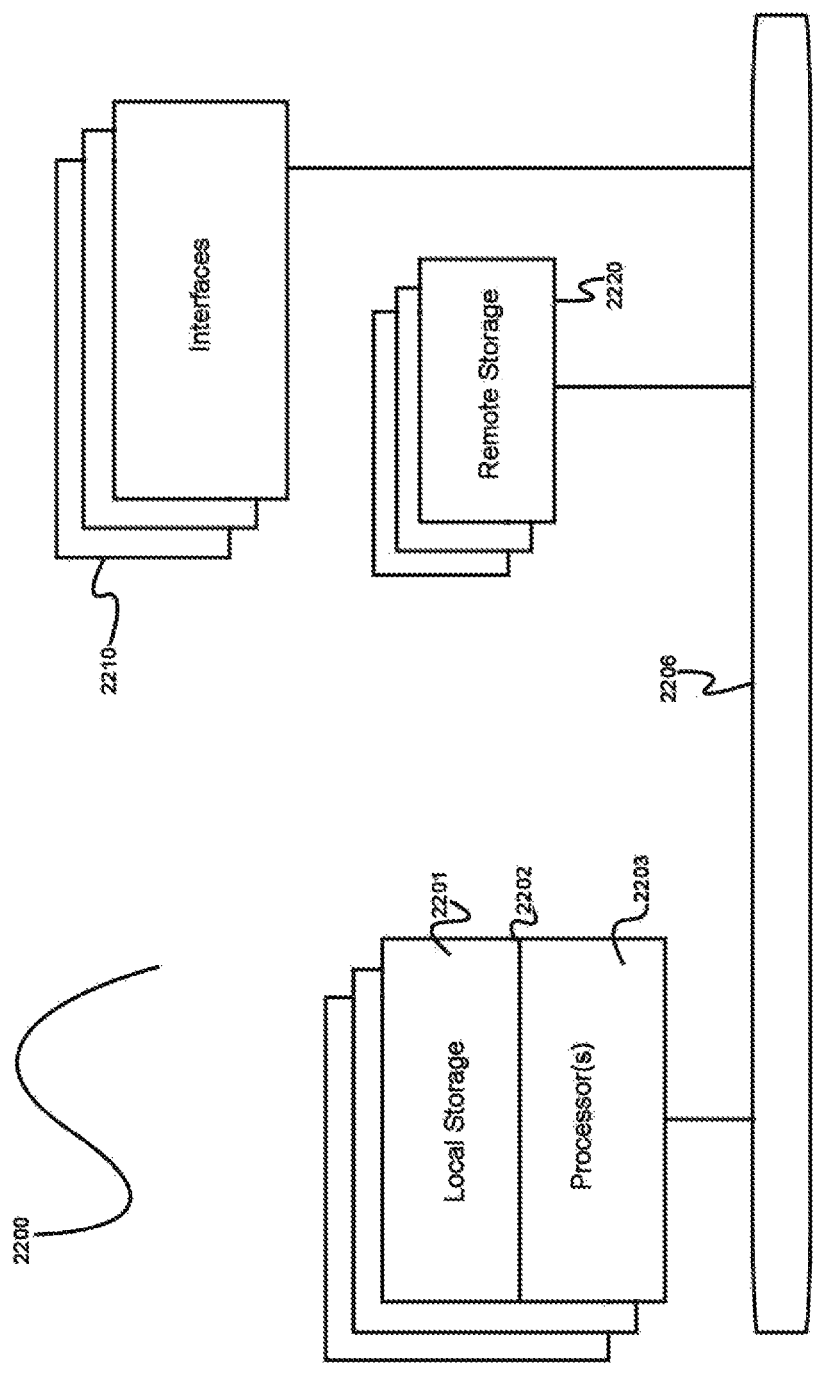
FIG. 22 is a block diagram illustrating an exemplary hardware architecture of a computing device used in an embodiment of the invention.

Referring now to FIG. 22, there is shown a block diagram depicting an exemplary computing device 2200 suitable for implementing at least a portion of the features or functionalities disclosed herein. Computing device 2200 may be, for example, any one of the computing machines listed in the previous paragraph, or indeed any other electronic device capable of executing software- or hardware-based instructions according to one or more programs stored in memory. Computing device 2200 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 2200 includes one or more central processing units (CPU) 2202, one or more interfaces 2210, and one or more busses 2206 (such as a peripheral component interconnect (PCI) bus). When acting under the control of appropriate software or firmware, CPU 2202 may be responsible for implementing specific functions associated with the functions of a specifically configured computing device or machine. For example, in at least one embodiment, a computing device 2200 may be configured or designed to function as a server system utilizing CPU 2202, local memory 2201 and/or remote memory 2220, and interface(s) 2210. In at least one embodiment, CPU 2202 may be caused to perform one or more of the different types of functions and/or operations under the control of software modules or components, which for example, may include an operating system and any appropriate applications software, drivers, and the like.

CPU 2202 may include one or more processors 2203 such as, for example, a processor from one of the Intel, ARM, Qualcomm, and AMD families of microprocessors. In some embodiments, processors 2203 may include specially designed hardware such as application-specific integrated circuits (ASICs), electrically erasable programmable read-only memories (EEPROMs), field-programmable gate arrays (FPGAs), and so forth, for controlling operations of computing device 2200. In a specific embodiment, a local memory 2201 (such as non-volatile random access memory (RAM) and/or read-only memory (ROM), including for example one or more levels of cached memory) may also form part of CPU 2202. However, there are many different ways in which memory may be coupled to system 2200. Memory 2201 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

In some embodiments, interfaces 2210 are provided as network interface cards (NICs). Generally, NICs control the sending and receiving of data packets over a computer network; other types of interfaces 2210 may for example support other peripherals used with computing device 2200. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 2210 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 22 illustrates one specific architecture for a computing device 2200 for implementing one or more of the inventions described herein, it is by no means the only device architecture on which at least a portion of the features and techniques described herein may be implemented. For example, architectures having one or any number of processors 2203 may be used, and such processors 2203 may be present in a single device or distributed among any number of devices. In some embodiments, a single processor 2203 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 2220 and local memory 2201) configured to store data, program instructions for the general-purpose network operations, or other information relating to the functionality of the embodiments described herein (or any combinations of the above). Program instructions may control execution of or comprise an operating system and/or one or more applications, for example. Memory 2220 or memories 2201 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, R, or any other scripting language).

Figure 23:
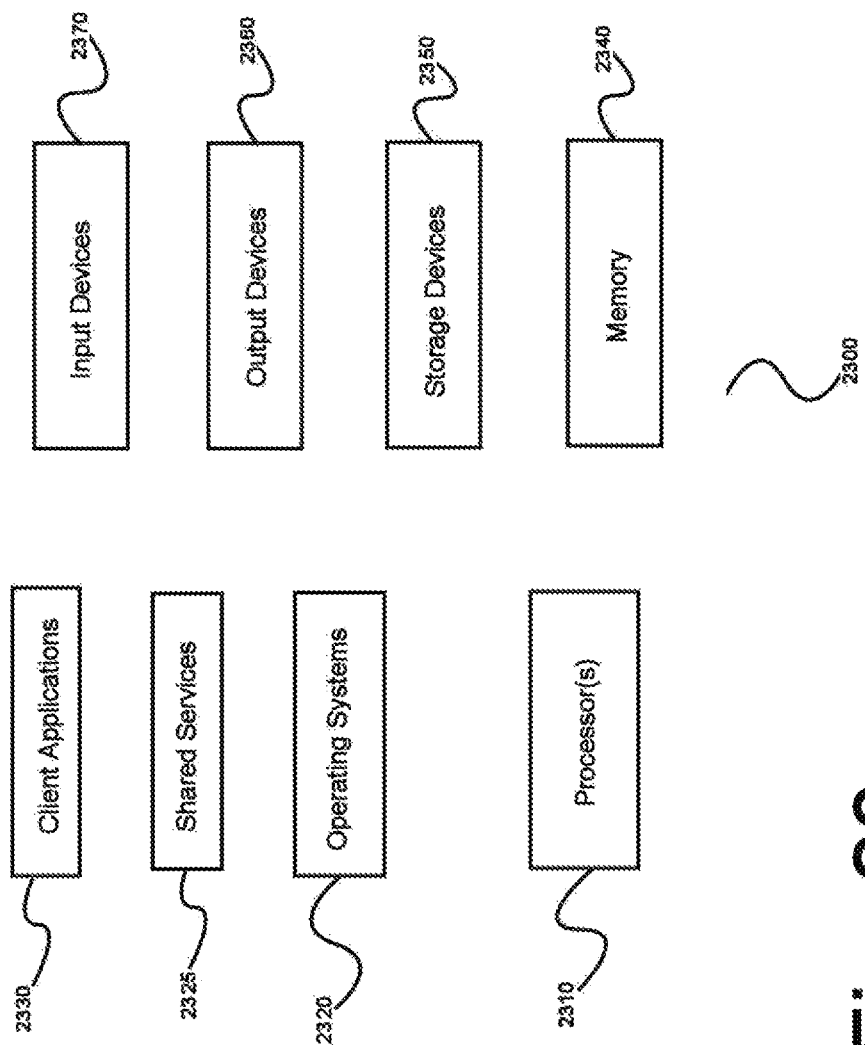
FIG. 23 is a block diagram illustrating an exemplary logical architecture for a client device, according to an embodiment of the invention.

In some embodiments, systems according to the present invention may be implemented on a standalone computing system. Referring now to FIG. 23, there is shown a block diagram depicting a typical exemplary architecture of one or more embodiments or components thereof on a standalone computing system. Computing device 2300 includes processors 2310 that may run software that carry out one or more functions or applications of embodiments of the invention, such as for example a client application 2330. Processors 2310 may carry out computing instructions under control of an operating system 2320 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 2325 may be operable in system 2300, and may be useful for providing common services to client applications 2330. Services 2325 may for example be WINDOWS™ services, user-space common services in a Linux environment, or any other type of common service architecture used with operating system 2310. Input devices 2370 may be of any type suitable for receiving user input, including for example a keyboard, touchscreen, microphone (for example, for voice input), mouse, touchpad, trackball, or any combination thereof. Output devices 2360 may be of any type suitable for providing output to one or more users, whether remote or local to system 2300, and may include for example one or more screens for visual output, speakers, printers, or any combination thereof. Memory 2340 may be random-access memory having any structure and architecture known in the art, for use by processors 2310, for example to run software. Storage devices 2350 may be any magnetic, optical, mechanical, memristor, or electrical storage device for storage of data in digital form (such as those described above, referring to FIG. 22). Examples of storage devices 2350 include flash memory, magnetic hard drive, CD-ROM, and/or the like.

Figure 24:
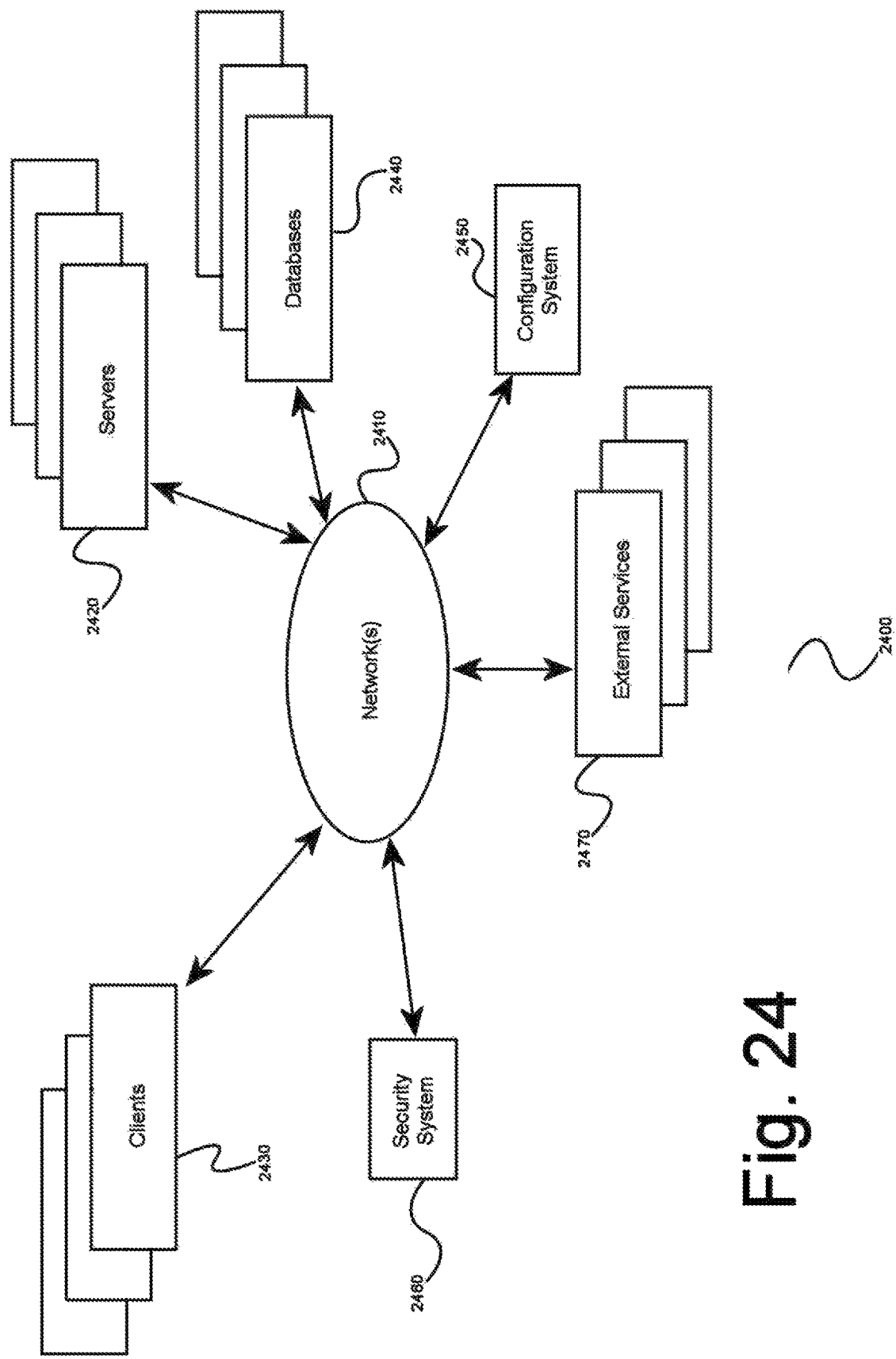
FIG. 24 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 24, there is shown a block diagram depicting an exemplary architecture 2400 for implementing at least a portion of a system according to an embodiment of the invention on a distributed computing network. According to the embodiment, any number of clients 2430 may be provided. Each client 2430 may run software for implementing client-side portions of the present invention; clients may comprise a system 2300 such as that illustrated in FIG. 23. In addition, any number of servers 2420 may be provided for handling requests received from one or more clients 2430. Clients 2430 and servers 2420 may communicate with one another via one or more electronic networks 2410, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 2410 may be implemented using any known network protocols, including for example wired and/or wireless protocols.

In addition, in some embodiments, servers 2420 may call external services 2470 when needed to obtain additional information, or to refer to additional data concerning a particular call. Communications with external services 2470 may take place, for example, via one or more networks 2410. In various embodiments, external services 2470 may comprise web-enabled services or functionality related to or installed on the hardware device itself. For example, in an embodiment where client applications 2330 are implemented on a smartphone or other electronic device, client applications 2330 may obtain information stored in a server system 2420 in the cloud or on an external service 2470 deployed on one or more of a particular enterprise's or user's premises.

In some embodiments of the invention, clients 2430 or servers 2420 (or both) may make use of one or more specialized services or appliances that may be deployed locally or remotely across one or more networks 2410. For example, one or more databases 2440 may be used or referred to by one or more embodiments of the invention. It should be understood by one having ordinary skill in the art that databases 2440 may be arranged in a wide variety of architectures and using a wide variety of data access and manipulation means. For example, in various embodiments one or more databases 2440 may comprise a relational database system using a structured query language (SQL), while others may comprise an alternative data storage technology such as those referred to in the art as "NoSQL" (for example, Hadoop, MongoDB, Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 2460 and configuration systems 2450. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 2460 or configuration system 2450 or approach is specifically required by the description of any specific embodiment.

Figure 1:
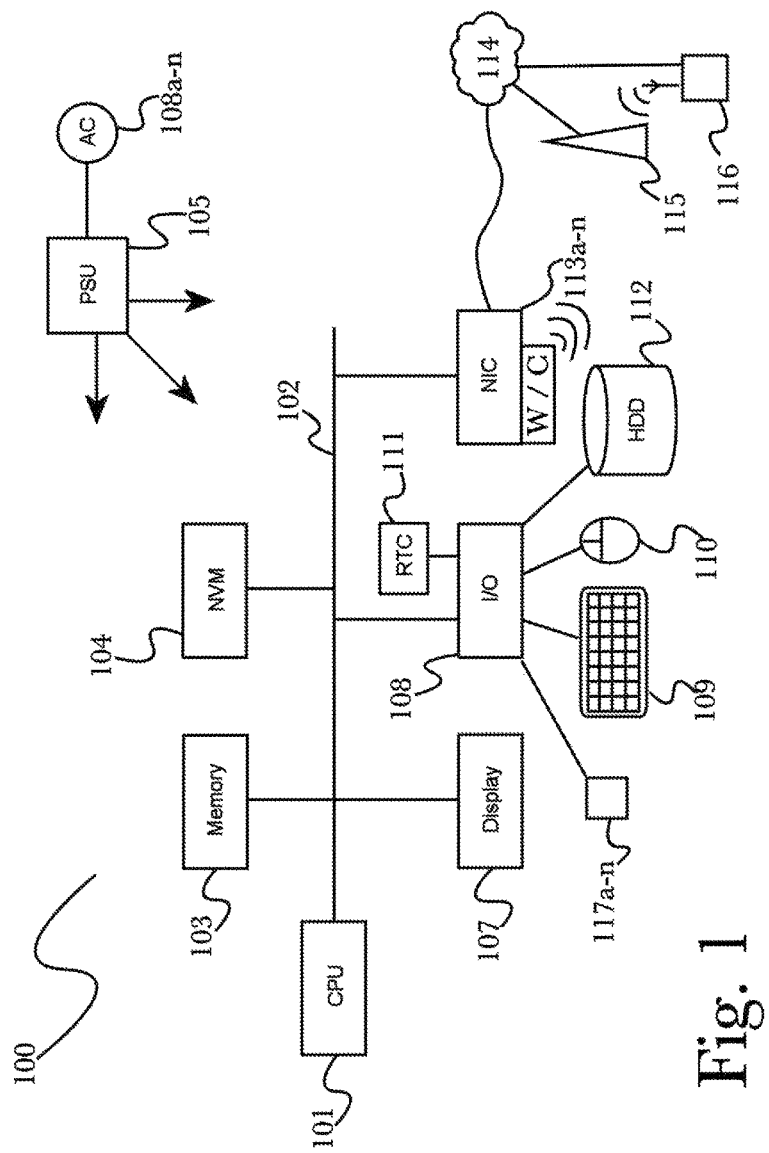
FIG. 1 is a block diagram illustrating an exemplary hardware architecture of a computing device used in various embodiments of the invention.

FIG. 1 shows a computer system 100, as currently may be typically used as a generic computing device for an end user device, both stationary and or portable, or a server. Computer system 100 is exemplary of any computer that may execute code to process data. Various modifications and changes may be made to computer system 100 without departing from the broader spirit and scope of the system and method disclosed herein. CPU 101 is connected to bus 102, to which bus is also connected to memory 103, non-volatile memory 104, display 107, I/O unit 108, and network interface card (NIC) 113. I/O unit 108 may, typically, be connected to an input device 109, such as a keyboard, a touch screen, buttons, etc., mouse or any other suitable graphical input device 110, hard disk (or in some cases other suitable storage, including, but not limited to solid state disk, RAID, network attached storage, storage area network, etc.) 112, one or more cameras 117$a$-$n$, and real-time clock 111. One or more network cards/interfaces 113$a$-$n$, some of which may be wireless, may connect to WANs 115 or wireless LANs 116, all of which are connected via Internet 114. Also shown as part of system 100 is power supply unit 105 connected, in this example, to ac supply 106. Not shown are batteries that could be present, and many other devices, including but not limited to special enhanced pointing or navigational devices, such as mice, jog wheels, etc., microphone(s) and speaker(s) and/or headset(s) for recording and or playing back audio, and other modifications that are well known but are not applicable to the specific enhanced functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 2:
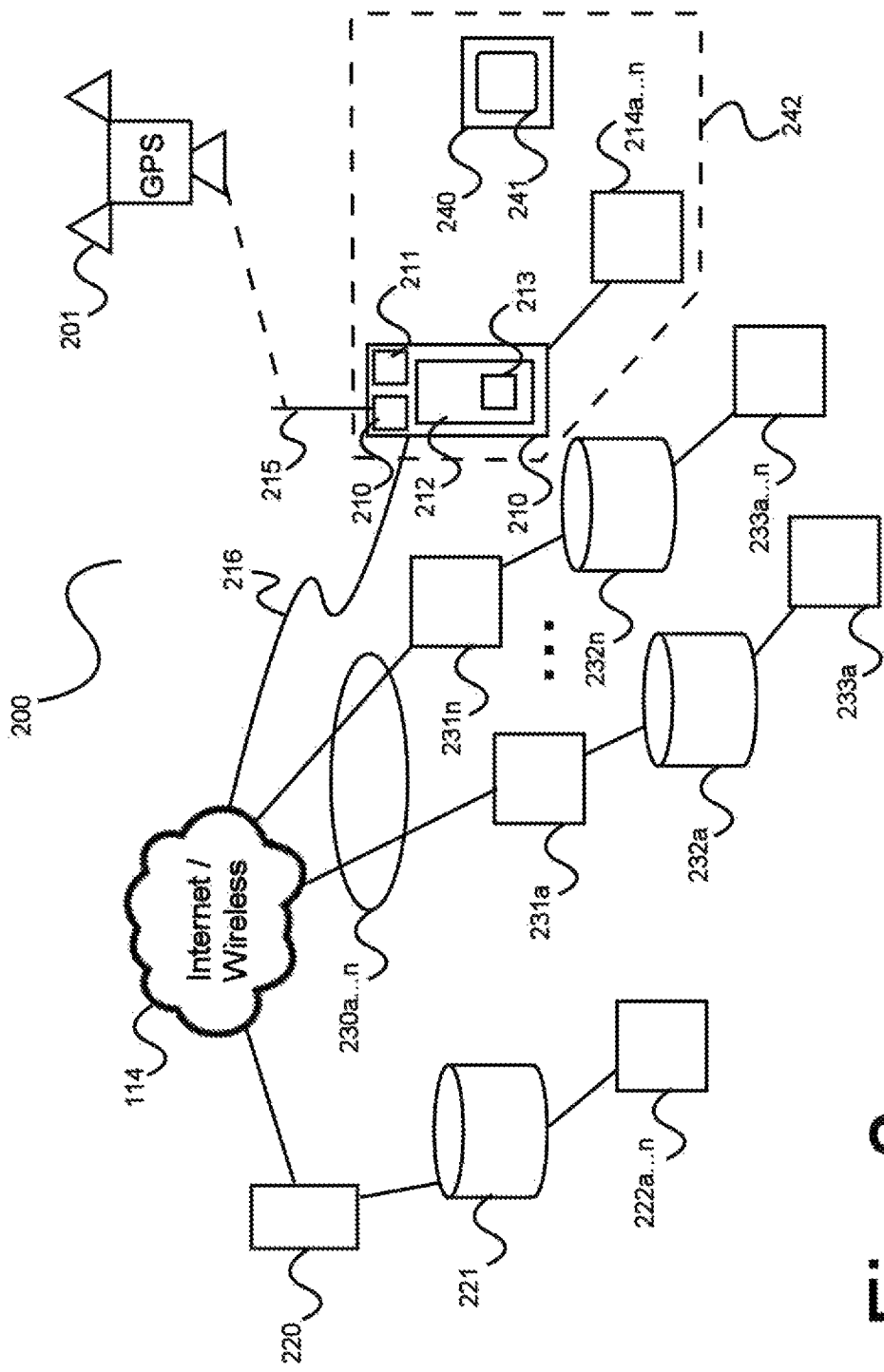
FIG. 2 shows an overview of an exemplary system, as currently typically used for so-called cloud based systems, but essentially equivalent to what have been called client-server systems.

FIG. 2 shows an overview of an exemplary system 200, as currently typically used for so-called cloud based systems, but essentially equivalent to what have been called client-server systems. The wireless Internet 114 is configured, for the purposes of the systems and methods disclosed herein, as one conglomerate network, even though it is clear that multiple carriers and other wireless LANs may be offered. An operating center has a server 220 with mass storage 221 and programs 222$a$-$n$ that are used to provide the service of the system and method disclosed herein, which service is described later and throughout. Note that server 220 has a structure similar to the computer discussed in FIG. 1. Multiple systems of servers at participating partners and or user devices at those partners' locations may be connected to the Internet via connections 230$a$-$n$. Each server or computing device has its own web service system 231$a$-$n$ (in some cases, they may have their own web infrastructure; in other cases, they may use cloud-based services, etc., which may appear as virtual servers), enabling a so-called Software as a Service (SaaS) delivery. Servers 213$a$-$n$ may have a structure similar to the computer discussed in FIG. 1. Each web service system 231 (whether real or virtual) has its own storage 232$a$-$n$ and its own sets of software 232$aa$-$an$ through 232$na$-$nn$. Also shown is a user device 210, which device could be a smart phone with a structure similar to the computing device discussed in FIG. 1. Device 210 contains, in this example, software 214$a$-$n$, a camera 211, and in some cases a GPS 215 chip that communicates with GPS satellites 250$a$-$n$. Software 214$x$ may be machine-readable code that is stored on a storage media, or downloadable over a network connection, and installed on a mobile computing device 210. A user in the field, for example at his home, at his office, in a testing lab, or anywhere else uses device 210 to interact with servers 213$a$-$n$ delivering the content as a web service, typically using one or more of the servers 213$a$-$n$ described herein. The user clicks on application 213 operating on device 210 and follows the instructions that appear on the screen, thus pulling up additional data from a server 213$a$-$n$ as discussed further herein. Further, it shall be deemed equivalent if, for example, instead of so-called on-premise servers 220 and/or cloud services-based servers 213$a$-$n$, a third-party service is used for hosting said services.

The embodiments disclosed herein align participants' incentives so that they accurately reveal both participants' preferences and a measure of intensity that animates those preferences in a way that is truthful, rigorous and easy to apply. Using an algorithmic mechanism, referred to herein as quadratic voting (QV), respondents reveal the intensity of their preferences about product and service attributes by allocating a budget of "preference currency"—buying one or more votes for attributes they care most about. According to QV, the cost of doing so equals the square of the total votes the respondent chooses to buy for a given attribute, so that to buy even one additional vote requires a carefully-considered decision from the respondent. QV is a subset of a larger class of voting techniques referred herein as convex voting (CV henceforth). CV techniques include any mathematical relationship between cost and votes in which the graph of cost versus votes satisfies two properties: (i) the graph is symmetric, or essentially symmetric about the y axis—so that votes for and against are equally (or roughly equally) costly, and (ii) the graph is mathematically concave up—and hence the derivative is increasing as the absolute value of x increases (that is, as one moves farther from the y axis, the derivative always increases). QV is also a subset of a class of techniques referred to herein as near-quadratic voting (near-QV). This collection of voting techniques includes those cost-vote relationships in which the mathematical derivative of the cost-vote curve is nearly linear over the range of voting values that generally occur. In effect, near-QV mechanisms, while not technically quadratic, essentially function as quadratic over common voting ranges. More precisely, a voting mechanism is near-QV if the Taylor polynomial of the cost-vote relationship has sufficiently small coefficients on all degree 3 and higher terms—that is, if the relationship can be well-approximated by a degree 2 polynomial (a quadratic). Use of the term QV below is meant to refer to both QV and near-QV mechanisms. For avoidance of doubt, QV is a subset of near-QV and near-QV is a subset of CV. Note that QV, near-QV, and CV also include the use of inverse relationships—for example, if the number of votes is encoded as the square root of the cost, rather than the cost as the square of the desired votes.

In some cases, a system for quadratic voting among a group may employ a networked server 220 or a cloud-based server 213*a-n*, comprising at least a processor, a memory, and a plurality of programming instructions stored in the memory and operating on the processor, the plurality of programming instructions comprising at least a quadratic voting (QV) software component 222*a-n* (or 233*a-n*). QV software component 222*a-n* (or 233*a-n*) may enable an administrator to log in and set up voting participation accounts, in some cases using convex voting (CV) as a broader form of QV. The system then may report, using QV software component 222*a-n* (or 233*a-n*), various voting payments, with the convex cost of voting having a linear or close to linear derivative with a mathematical process for accurate presentation of the votes. Additionally, the starting shape of the function may be calculated according to at least one of a number of options offered by QV software component 222*a-n* (or 233*a-n*) and selected by the administrator, including but not limited to the number of people involved, an amount of voting currency provided, a time frame allowed for voting, the use of external funds matching mechanisms, auction aspects, and redistribution of unused voting currency. In some cases, a value may be recalculated by QV software component 222*a-n* (or 233*a-n*) based on certain outcomes. Additionally, an initial survey may estimate the leanings of voters in one or more sets of voting rounds, and a proposed value may be calculated and offered for the user to vote, giving that user best chances to succeed in effecting his desired outcome. In various embodiments only one or the other of QV and CV are mentioned, but they should be considered by and large to be interchangeable, as long as the convex voting cost has a linear or close to linear derivative.

Further, this system may be used by third parties to create a QV market research survey and to obtain reports on survey results obtained therefrom. Additionally, an online market research service may offer participants real or virtual money as voting currency, for use in one or multiple surveys, with the virtual money, in some cases, having actual value to that it may be redeemed, for example, for air miles, and the remaining credits may be raffled to the participants.

Further, in some cases, in a survey, visual, kinesthetic, taste-based, or acoustic feedback may help the participant understand the underlying voting concept. In some instances, the participant may be given a physical voting device with a slider or knob, which device may contain components to offer feedback based on movement of the slider or knob. Thus, as a participant moves the slider or turns the knob, any of several physical indications of vote cost may result, such as, for example, linearly increasing noise, or linearly increased resistance due to oppositional force by a rubber band, spring, or other elastic material. In other instances, software may offer virtual resistance, such as by requiring the participant to go an increasing number of times or distance the farther the slider is moved; it may also require holding down a button for an increasingly period of time to increase the number of votes assigned, or require a user to move her finger around a displayed wheel an increasing number of times in order to increment votes; or the color of a rubber band representation may signify increased resistance even if no actual additional kinesthetic resistance is applied. In some cases, the device may be self-contained and connect to a user's computing device or smart phone. In other cases, a mechanical device may be attached to a smart phone and may interact with a part of the screen that contains some indicia and input elements. For example, the device may have an elastic band exercising increasing force on a mechanical slider that has a foam tip that can be recognized by the smartphone as a user's finger sliding across the screen. Alternatively, the device may use a turn, and instead of a rubber band a spring may be used; or in yet another alternative, the smartphone camera may capture a motion and convert it into a slider motion.

In addition, an option may require that the voter view a video before voting or similar introductory processes. Also, the questions for voting may appear in a continuous set of blocks for easy viewing on both mobile devices and other computing devices, so users can participate easily from any environment.

The system and method disclosed herein comprises a technique for individuals to decide among N mutually exclusive and exhaustive alternatives such as, for example, which of the following ten candidates should receive the one job offer we can make. One alternative is randomly selected as the default alternative. Individuals can use their currency (artificial or real as described herein) to purchase votes in favor of or against each alternative to the default. The cost of these votes is the square of the votes purchased (or whatever the QV, near-QV, or CV function is relating votes and currency), in units of the currency. If any alternative has net positive votes, then whichever alternative has the most net positive votes wins. If none has net positive votes the default wins. If real money, or money that has some lasting but artificial value outside of this decision, is used then the funds raised are refunded in a manner such that no individual receives back any of the funds said individual has put in. In yet other cases, the currency is entirely internal to the (collection of) decisions being presented at a single moment. In some instantiations, respondents are not voting for and against alternatives to a given status quo, but instead dividing resources among a set of proposals to determine which issues matter most when the effect of scarcity is present (via a limited preference currency bank). In addition, the allocation of votes using currency need not simply be for or against a proposal—showing preference among a binary of options on a single proposal—but can also include any fixed number of preference dimensions on a proposal, or even on a continuum of preference dimensions.

Detailed Description of Exemplary Embodiments

Figure 3:
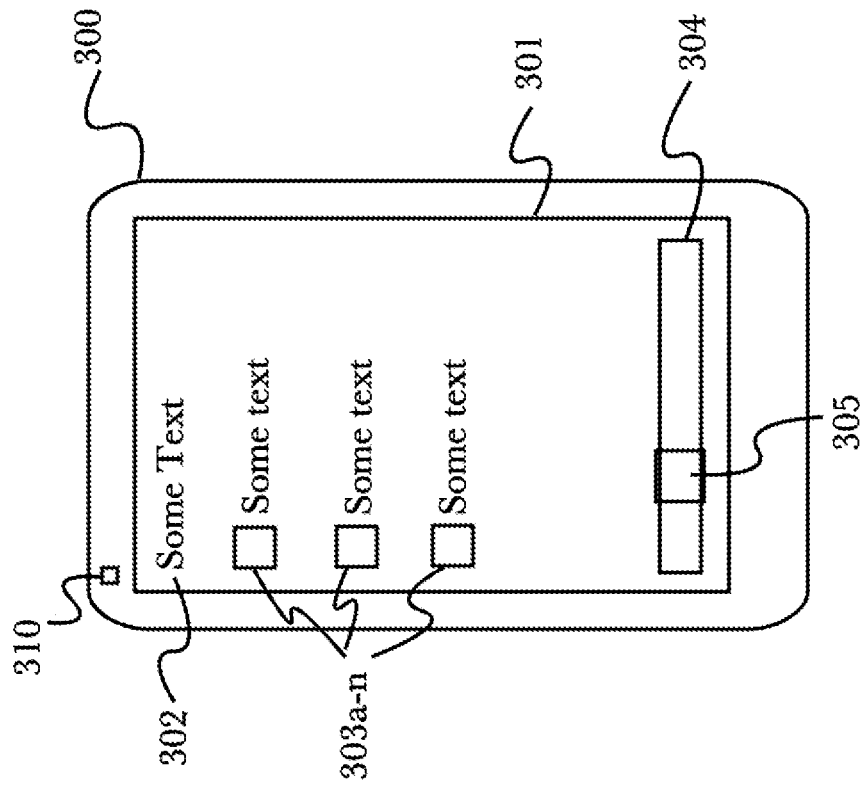
FIG. 3 shows an exemplary mobile device with a screen, according to one aspect of the system and method disclosed herein.

FIG. 3 shows an exemplary mobile device 300 with a screen 301, according to one aspect of the system and method disclosed herein. On screen 301 appears an application display, comprising header section 302 and options 303*a-n*. Depending on the nature of provided options 303*a-n*, a user may select only one or more than one. Box 304 may contain a slider 305 that a user may adjust to increase or decrease the number of votes the user wants to give to selected option(s). User-facing camera 310 may be employed in some of the implementations of physical add-ons for using the camera to find a lever position, rather than using the touchscreen. Screen 301 may also be employed to produce voting decisions via the use of haptic and/or kinesthetic methods, such as are provided by the 3D Touch and Force Touch capabilities of the Apple iPhone 6s.

Figure 4:
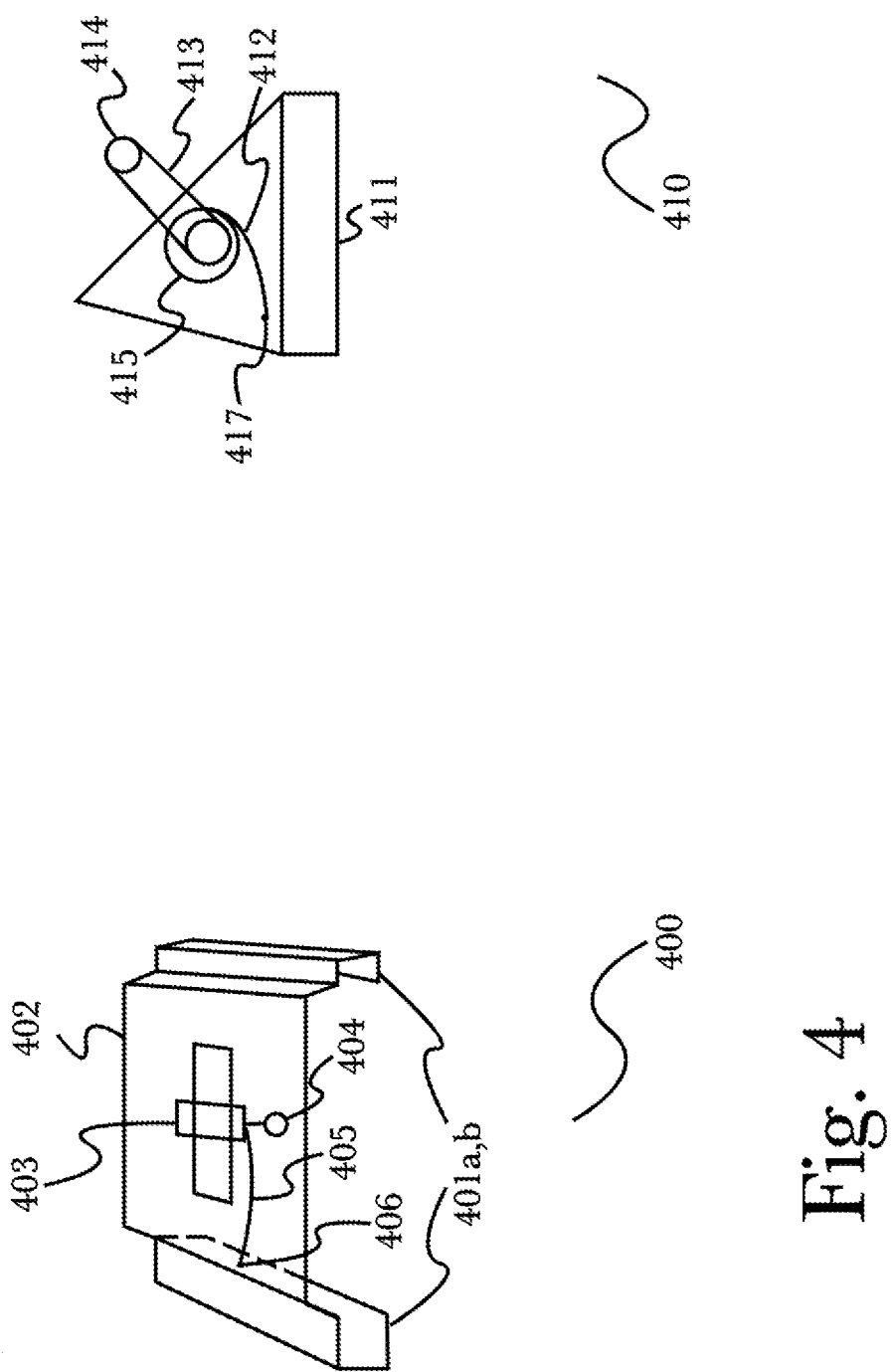
FIG. 4 shows implements that may be added to a mobile device to enable users to adjust the number of votes for an option or set of options using a physical device, according to aspects of the system and method disclosed herein.

FIG. 4 shows implements or devices 400 that may be added to a mobile device to enable users to adjust a number of votes for an option or set of options using a physical device, according to aspects of the system and method disclosed herein. For example, device 400 may be slid over a lower portion of mobile device 300, described above in the discussion of FIG. 3. Two rail sections 401a and 401b may slide over the sides of the case. Bridge section 402 may support physical slider 403, which has a knob 404 with a soft extension that touches a screen of device 300. This knob extension may be made of, for example, foam material similar to the material in stylus devices currently available for use with touch-screen devices. In addition, an elastic device 405, such as, for example, a rubber 405 or a spring, may be attached to bridge 402 at point 406 and to slider 403 so that physical resistance would increase as a user moves knob 404 further to the right along slider 403 to increase a number of votes for an option or set of options, as described above in the discussion of FIG. 3. Device 400 may cover only a lower or bottom section of device 300 where slider 305 is displayed, so that an upper portion, where header 301 and options 302a-n may appear on screen, is readable and accessible. In an alternative approach, device 410 may have a turning knob 414 and spiraling elastic cord 412 (e.g., a rubber band) attached at point 417 at a corner of side 411 of device 410. On an underside of device 410 may be a disk 415 to which may be appended a knob of material similar to that of knob 414. This approach may be used with a rotational design for vote adjusting on screen 301. Thus the physical resistance of elastic cord 412 becomes greater as a user turns knob 414 to the left to increase a number of votes. Both devices 400 and 410 may be manufactured inexpensively from, for example, plastic, so they may be considered disposable devices.

Figure 5:
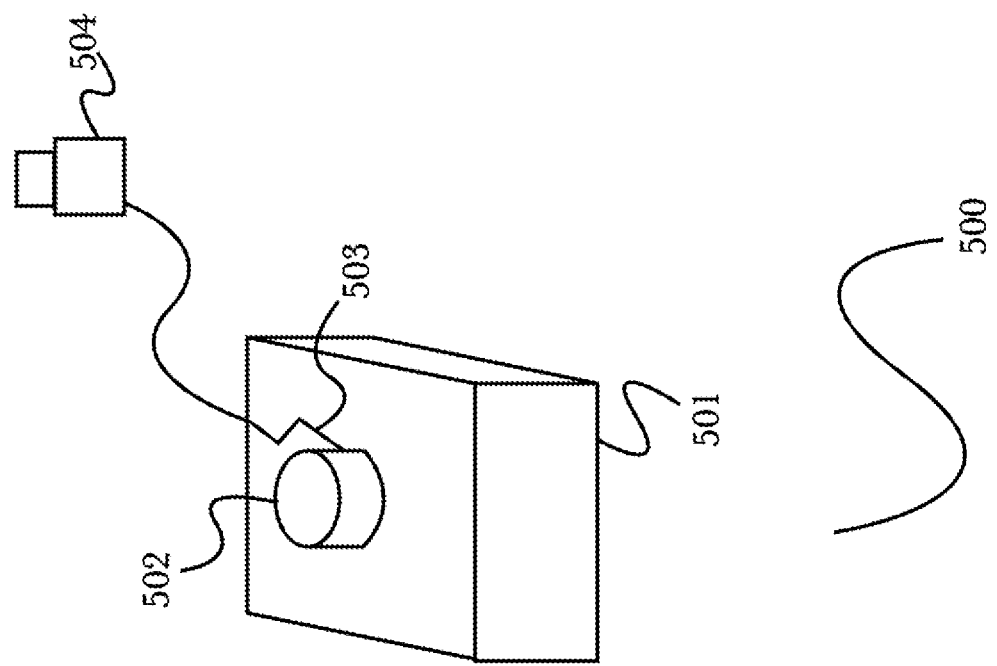
FIG. 5 shows a slightly more evolved device, according to one aspect of the system and method disclosed herein.

FIG. 5 shows a slightly more evolved device 500, according to one aspect of the system and method disclosed herein. Device 500 has the same purpose as devices 400 and 410; that is enabling a user to adjust his number of votes, but device 500 is physically separate and independent of device 300. In this example, box 501 connects via cable to USB connector 504. Markings 503 may show the device operating information or usage data such as, for example, a scale; and knob 502 may be for a user to turn. Some mechanical device or elastic material (not shown), such as, for example, a spring or rubber band, may increase resistance when a user turns the knob. In some cases, instead of using a USB connection for power and communication, device 500 may be powered by a battery and may communicate via a wireless connection, such as Bluetooth, Wi-Fi, or any other similar, suitable protocol.

Figure 6:
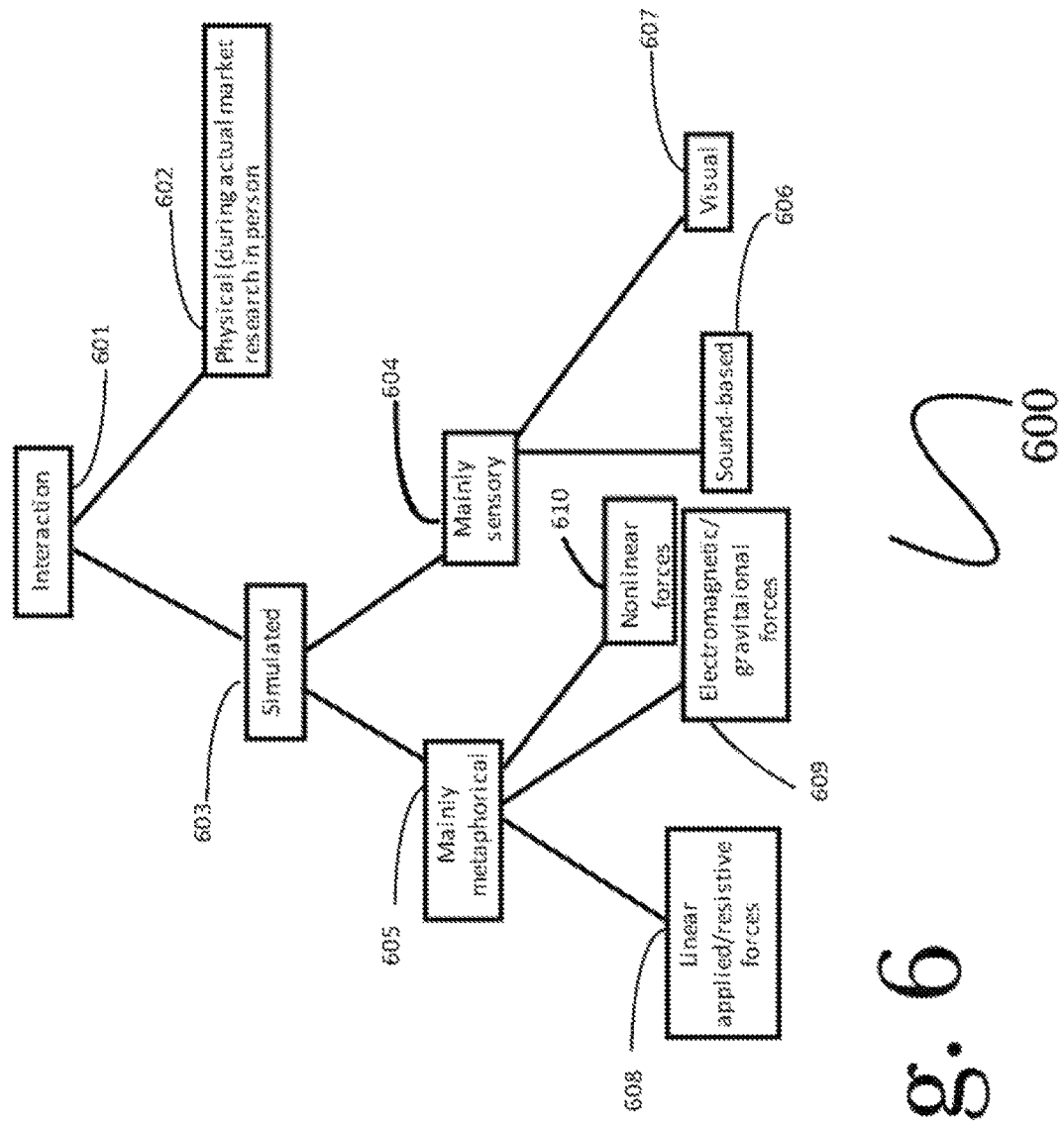
FIG. 6 is a diagram of interaction selections, according to one aspect of the system and method disclosed herein.

FIG. 6 is a diagram of interaction selections 600, according to one aspect of the system and method disclosed herein. At the top, a designer can set up a vote or market survey to select an interaction 601. In a next choice, a designer may decide on either a physical interaction 602, using devices 400 previously described in the discussions of FIGS. 4 and 5 or some other, similar physical implement, or a simulated interaction 603. A simulated interaction may be set up so that as a user increases a number of votes (analogous to moving a physical slider), more interactions are required, as a visual representation of increased difficulty. If a designer selects mainly sensory-based interactions 604, he then selects whether to use sound-based interactions 606 or visual interactions 607. If the designer selects mainly metaphorical interactions 605, he then has choices of linear applied/resistive forces 608 (such as, for example, the resistive forces described in the discussions of devices 400, 410, and 500), electromagnetic or gravitational forces 609, or non-linear forces 610. Then the QV software according to embodiments of the invention may be configured for the selected interaction(s), with the appropriate interfaces. In some cases, software for a selected interaction type may be downloaded to a personal phone; while in other cases such as, for example, a controlled lab environment, a tablet with software already installed and appropriate physical devices already attached may be distributed to users.

Figure 7:
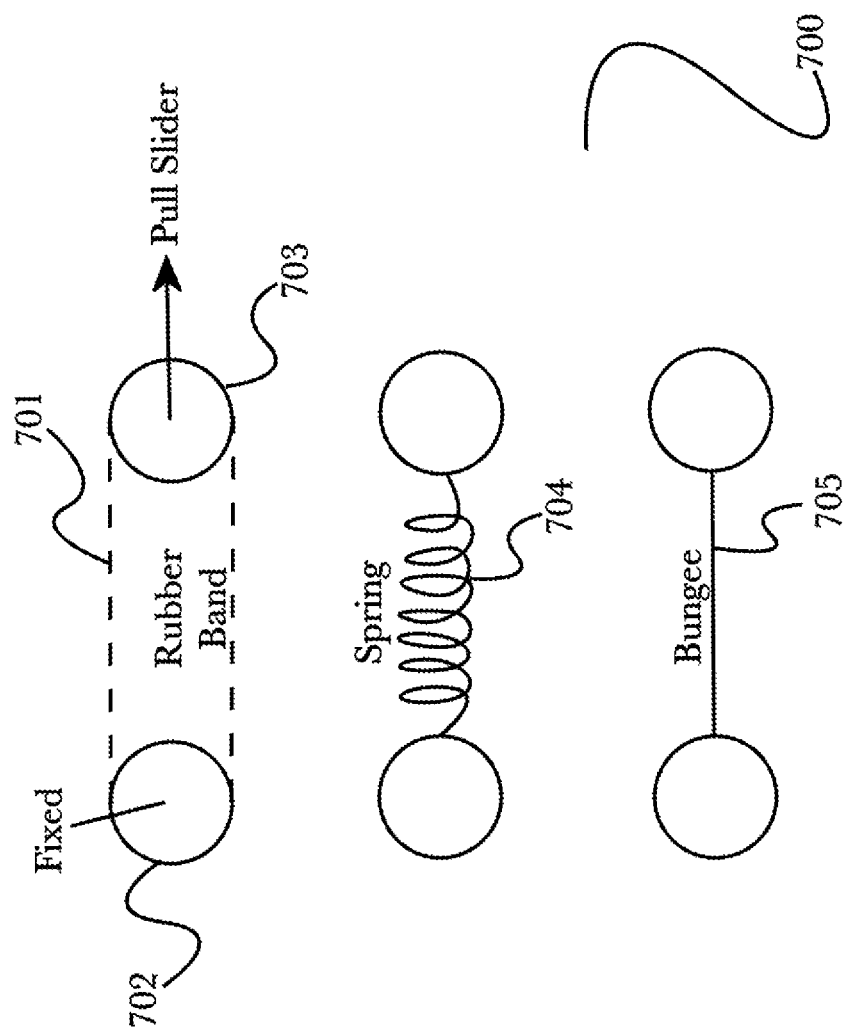
FIG. 7 shows a few exemplary implements for linear applied/resistive interactions, according to one aspect of the system and method disclosed herein.

FIG. 7 shows a few exemplary implements 700 for linear applied/resistive interactions, according to one aspect of the system and method disclosed herein. Device 701 has a fixed position point 702 and a pull slider 703. They are, in this example, connected by a rubber band, so that as a user pulls slider 703 to the right, resistance increases. Units 705 and 704 are analogous to unit 701 but use, in lieu of a rubber band, a bungee or a spring for the increased resistance.

Figure 8:
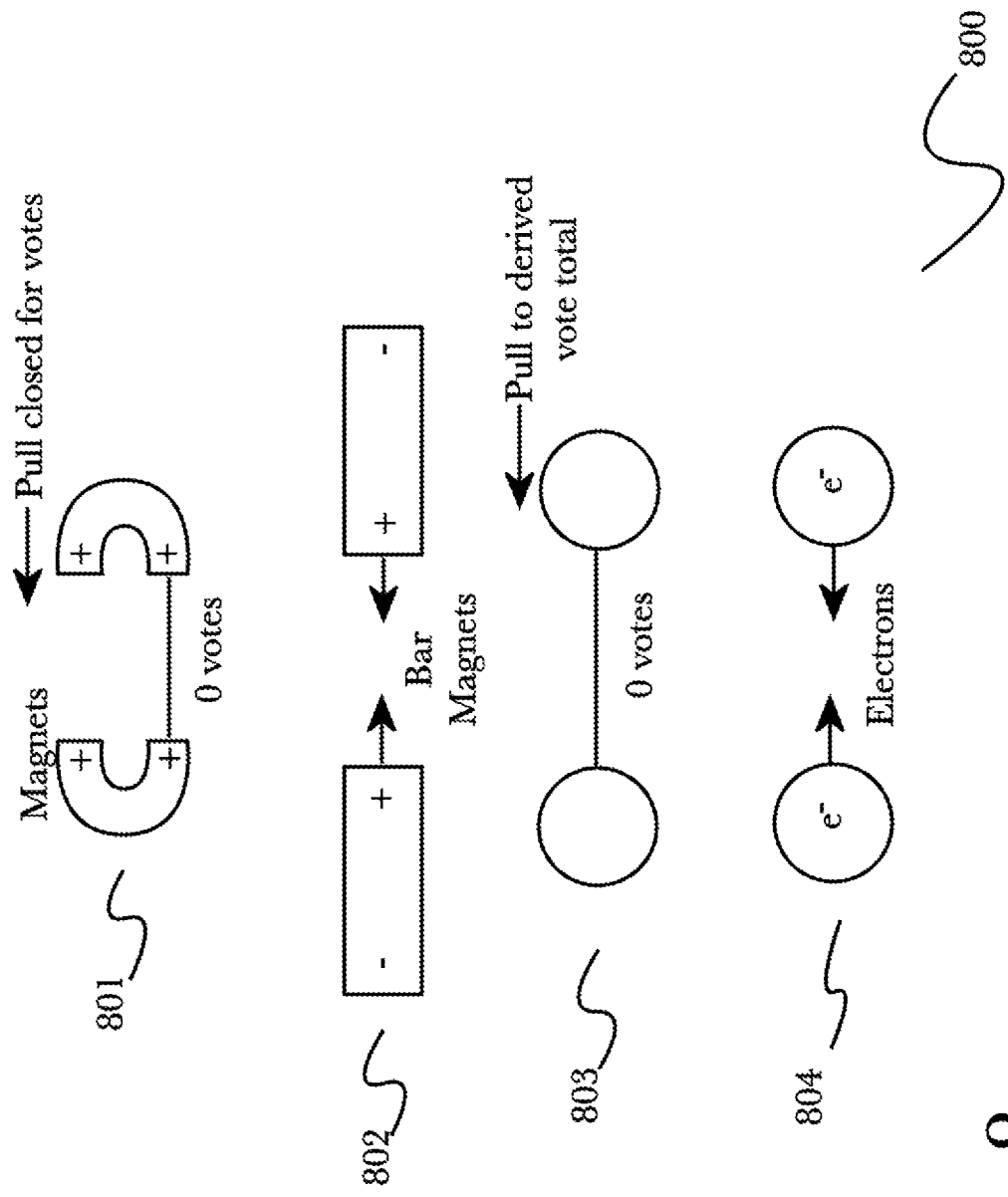
FIG. 8 shows exemplary magnetic and electric interactions to increase and decrease vote quantities, according to one aspect of the system and method disclosed herein.

FIG. 8 shows exemplary magnetic and electric interactions 800 to increase and decrease vote quantities, according to one aspect of the system and method disclosed herein. In magnetic interaction 801, two horseshoe magnets exert oppositional forces, so a user must increase the force applied to bring the magnets close in order to increase votes. Interaction 802 captures the same magnetic-resistive principle with bar magnets, while interaction 803 demonstrates the same principle in similarly electrically charged particles such as, for example, two protons. Interaction 804 shows the principle in the common setting of electrons, which, like other metaphorical examples, could contain visual elements (e.g., color changes in the electrons) to strengthen the metaphor.

The examples in FIGS. 7 and 8 can both be used to implement mechanical devices, as well as visualization tools on a display presented to a user. This dual usage is generally true for all the visual help examples presented herein.

In some cases, an exponent other than 2 in the vote-cost relationship can be used or may even be desirable. In these cases, near-QV or CV mechanisms are more appropriate.

In some cases a nomination procedure is used to determine whether a vote is held using either binary (standard) or multi-option QV. An individual or group wishing to nominate an alternative places currency into an escrow account. The number of "signatures" to put the issue onto a ballot is the sum of the square root of currency thus committed. A statistical estimation procedure using any suitable one of many practiced statistical approaches is used to set a threshold. Any nominated alternative to the status quo with a total number of signatures above this threshold is included on the ballot. All funds in escrow are, if this vote is held, committed to be positive votes in favor of the nominated alternative.

In some cases, a matching funds procedure enables an outside institution (charitable, individual, or government) to "match" the contributions of individuals to a public good, such as, for example, NPR, or a campaign, for example on Kickstarter.com, as a project or a prize awarded for a great scientific researcher. There are several causes to which individuals can contribute. Individuals make contributions with money and the total amount received by each cause equals a constant k times the square of the sum of the square roots of all the funds contributed. For example, if three individuals contribute $1, $4, and $9, respectively, the cause receives $(1+2+3)^2=36$ k dollars, which is obviously greater than the sum of the contributions (14) if k=1. According to the embodiment, k may be set so that a total amount of excess given to the causes over the amount contributed by the individuals equals the amount of matching funds contributed by a sponsor, but k is typically never allowed to be greater than 1. Usually, k is common across all projects.

Sometimes an auction makes it easier for individuals to interact with a QV system and may be combined with any of the versions described herein. Each individual submits a value she gives for each alternative or possibly submits a set of information that is easier for her to give, such as filling out a survey on her general opinions, which a computer recommender system then converts into values. The computer system may then use everyone's reports and a statistical estimation procedure using any suitable one of many practical statistical approaches known in the art may be used to estimate a distribution of individual values. The computer may then suggest to an individual how much she should vote on each alternative based on her preferences and an equilibrium under QV that it calculates given this value distribution and using a computational game theory software package to compute an approximate equilibrium. It also may report to individuals how it came up with this suggestion and may offer an option to individuals to change their votes via this suggestion or to just implement it, to make it easy for individuals.

In some cases, an approach for returning refunds to minimize expected redistribution is used. A statistical machine learning model is trained to predict, based on observable demographic (e.g. income, gender, location) and institutional (e.g., does this person own the product, or are they high in the organization?) characteristics of individuals and past data, expected expenditures that an individual will likely make in a QV implementation with real or long-lasting fake money. A total expenditure may be tallied across all individuals. Individuals may then be assigned a share of the total expenditure to be received of purchases made by each individual other than themselves. This assigned share is approximately equal to their share divided by the total share of all individuals other than the individual in question. An individual then, after the vote, receives a refund in proportion to this calculated share for each individual other than herself who contributes.

Figure 9A:
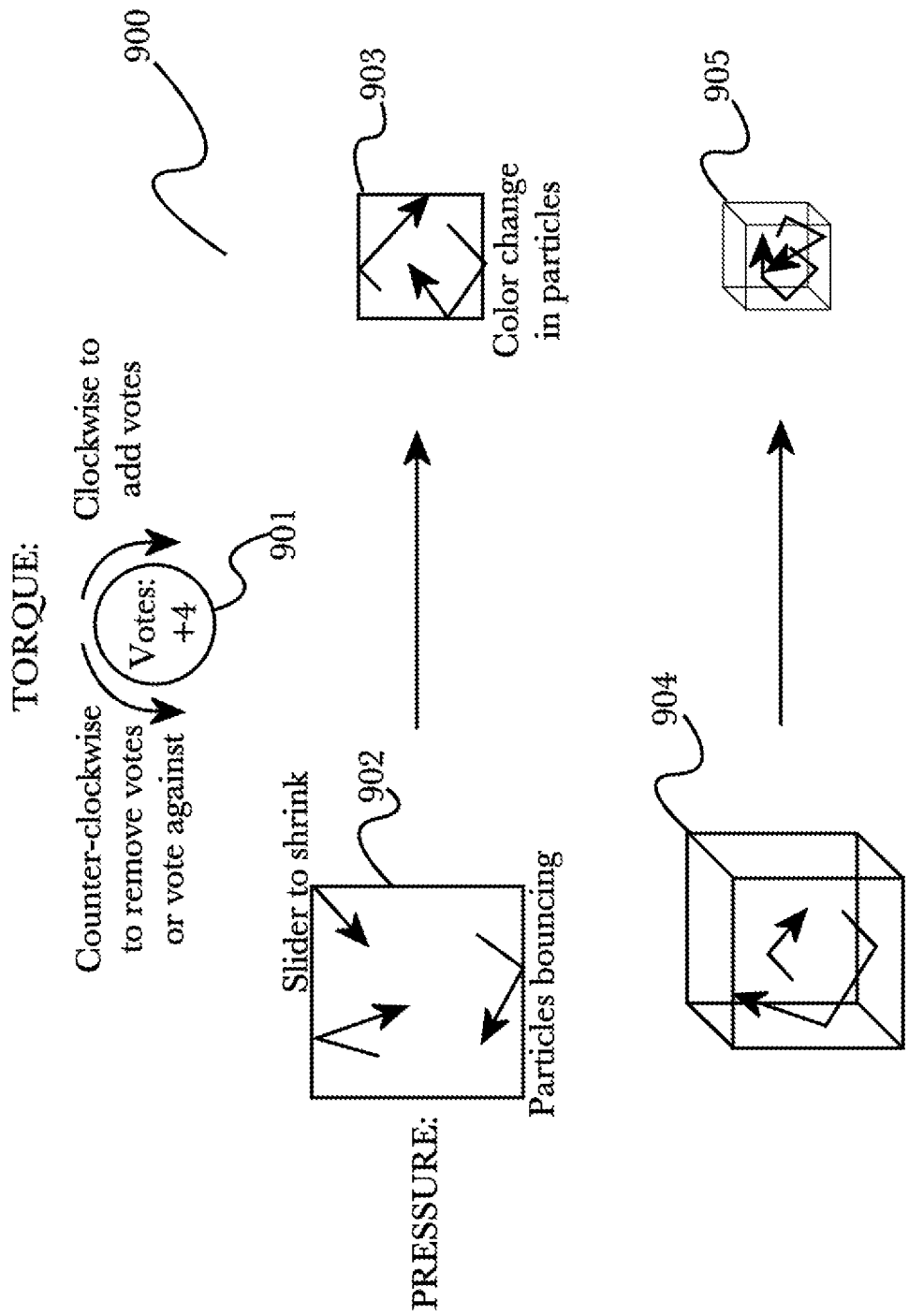
FIG. 9a shows exemplary torque- and pressure-related interactions to increase and decrease vote quantities, according to one aspect of the system and method disclosed herein.

FIG. 9a shows exemplary torque- and pressure-related interactions 900 to increase and decrease vote quantities, according to one aspect of the system and method disclosed herein. In interaction 901, a user may turn a knob or other physical device (using torque) counter-clockwise to reduce the number of votes, while turning the knob clockwise to add votes (or vice versa). The knob may have a center-neutral position with adjustments available either to the right or left, in the case of increasing or decreasing votes from a certain number of votes allotted by default; or it could go only in one direction to increase votes from zero to the desired amount. In interaction 902, the user moves a slider to increase pressure to, for example, compress gas in a cylinder. The farther the user moves the slider to increase the number of votes, the greater pressure the user sees, as shown in interaction 903. Interactions 904 and 905 show this process in three dimensions: the user increases the pressure by pulling a vote slider (either separate from the visualization or incorporated therein), and the change in pressure is proportional to the cost of making such a vote. In addition, these visualizations may be accompanied with effects that strengthen the cognitive metaphor, including color change in the bouncing particles based on pressure, or a temperature meter related to the energy of the particles in the pressure system.

FIG. 9b shows exemplary sound-based sensory interactions 910 to increase and decrease vote quantities, according to one aspect of the system and method disclosed herein. In interaction slider element 911, as the slider moves from left to right, noise becomes louder as votes increase and an increasing amount of currency is allotted. In interaction 912, the noise level in decibels—applause or boos—at a performance is mapped quadratically, as shown in graph 913, to currency usage. In this interface, users are using sliders on the preference currency, rather than directly on the votes, and votes are represented by the nature of the sound (volume and positive/negative affect) produced. This use of sliders on the preference currency (rather than votes) is possible on the other interfaces discussed herein, throughout. In addition to mapping currency usage to decibel level, such an interface could be used to map currency usage to loudness, perceived loudness, power, voltage, and other auditory elements.

Figure 10:
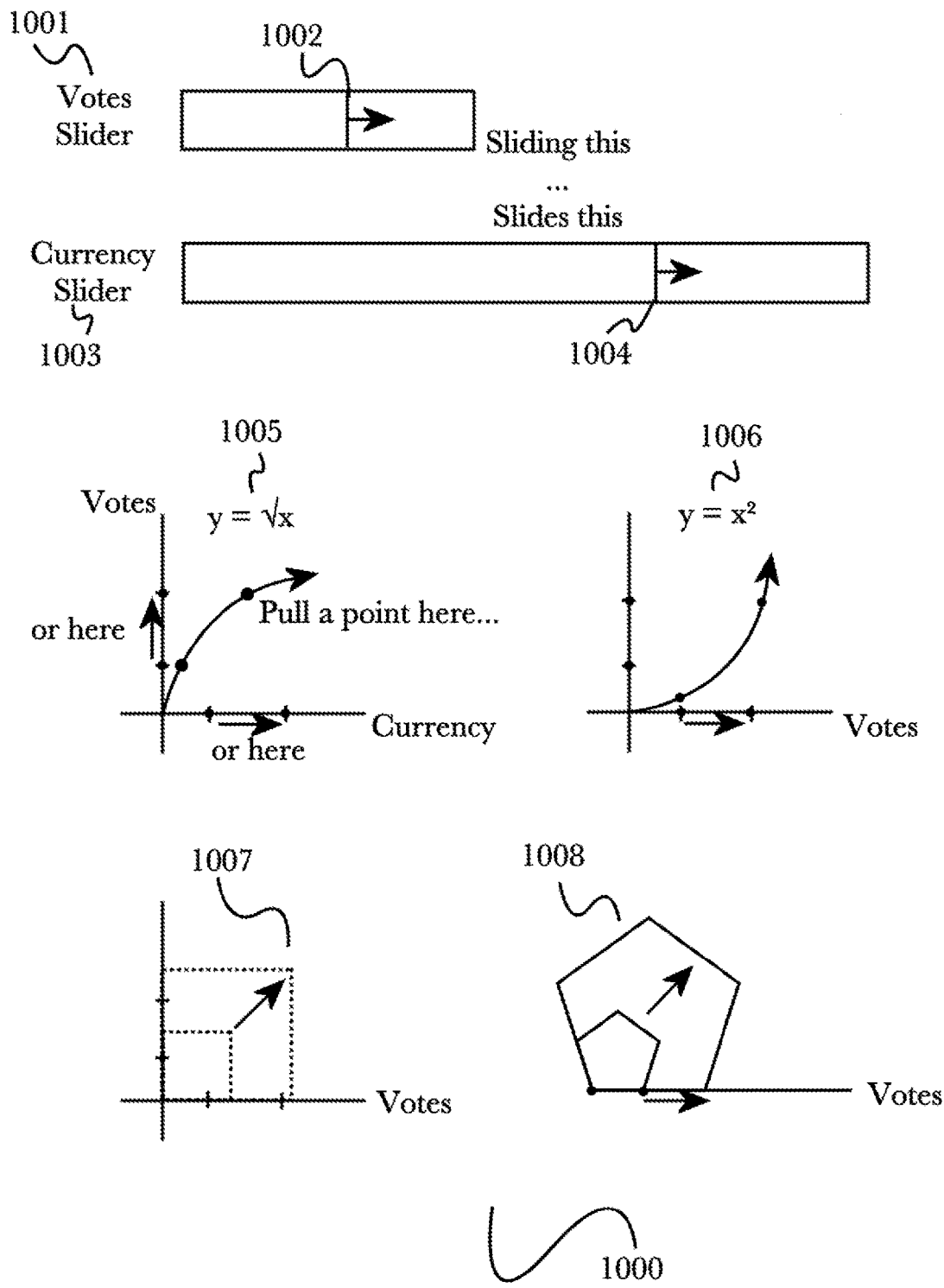
FIG. 10 shows an exemplary usage of slider boxes to quadratically increase the quantity of a selected entity.

FIG. 10 shows an exemplary usage 1000 of slider boxes to quadratically increase the quantity of a selected entity. As slider bar 1002 is moved in primary votes slider box 1001, slider bar 1004 moves quadratically and in synchronous real-time (or as a delayed resetting upon releasing the slider) in currency slider box 1003. Thus a vote unit of four in votes slider box 1001 corresponds to a currency unit of 16 in currency slider box 1003. Conversely, the user could move slider 1004 to affect the position of slider 1002. Other examples that convexly relate votes to various types of physical or logical entities are shown in interaction diagrams 1005-1008. Interactions 1005 and 1006 require the user to interact directly with either the square-root (1005) or quadratic (1006) curves, pulling a point along the curve (or its slider projections onto the x and y axes) to indicate voting preference. Other graphs displaying convex functions (or their inverse functions) with linear or near-linear derivatives could also be used. Diagrams 1007 and 1008 encode voting currency into the area of a visualization and the vote total into the side length of a figure. Here, the user pulls a slider to increase the side length (and hence, votes), and the area (and hence, cost in preference currency) grows proportionally.

Figure 11:
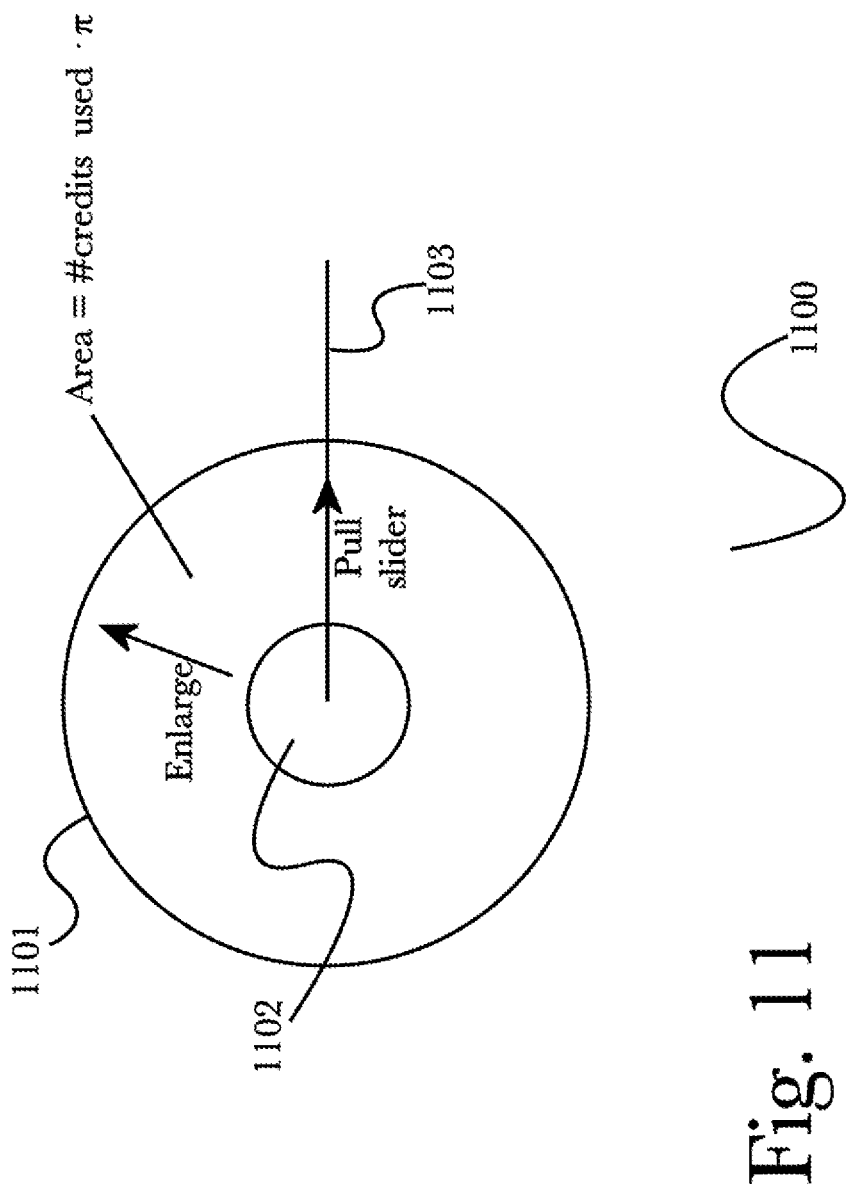
FIG. 11 shows an exemplary simulated interaction of enlarging an entity in which area and some dimension are related quadratically, according to one aspect of the system and method disclosed herein.

FIG. 11 shows an exemplary simulated interaction 1100 of enlarging an entity in which area and some dimension are related quadratically as in interactions 1007 and 1008, according to one aspect of the system and method disclosed herein. Here, votes may be encoded in the radius or diameter of the circle, and the area, or $r^2\pi$, where $\pi=3.14$ . . . is proportionally linked to the preference currency required to make such a vote.

Figure 12:
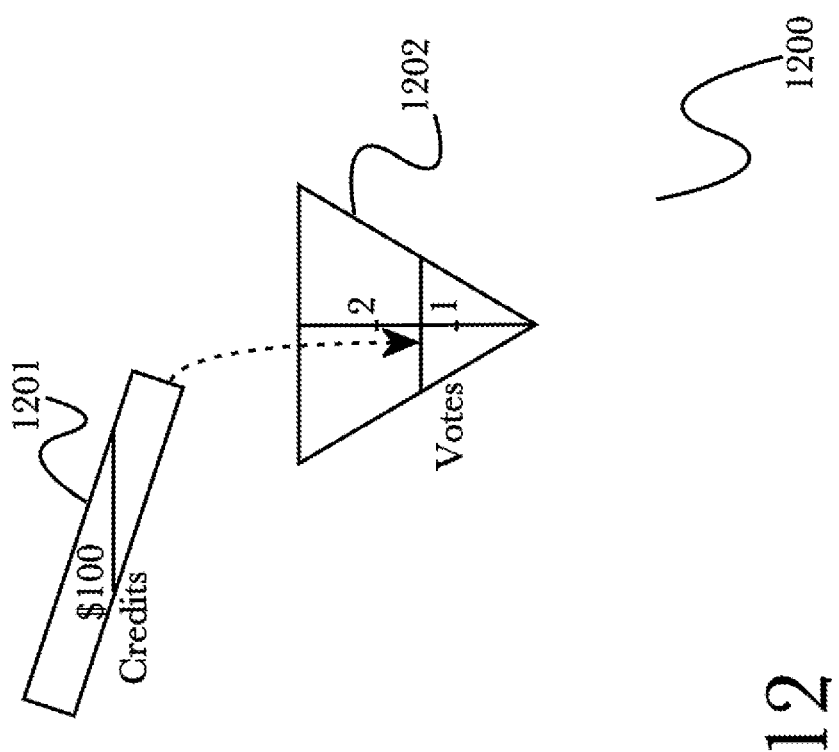
FIG. 12 shows an exemplary simulated interaction, according to one aspect of the system and method disclosed herein.

FIG. 12 shows an exemplary simulated interaction 1200, according to one aspect of the system and method disclosed herein. In this example, a user can pour liquid, representing credits or currency, from vessel 1201 into funnel 1202, where it represents votes. The number of votes are measured by equally spaced lines on the funnel; therefore, to increase the number of votes in increments, the user must pour an ever-greater amount of liquid into the funnel as he raises the measure of votes from one incremental mark to the next. While the pictured funnel is a two-dimensional triangle, any two- or other-dimensional shape could be used that requires ever-increasing amounts of preference currency to raise the voting tally indicator (following a QV, near-QV, or CV rule).

Figure 13:
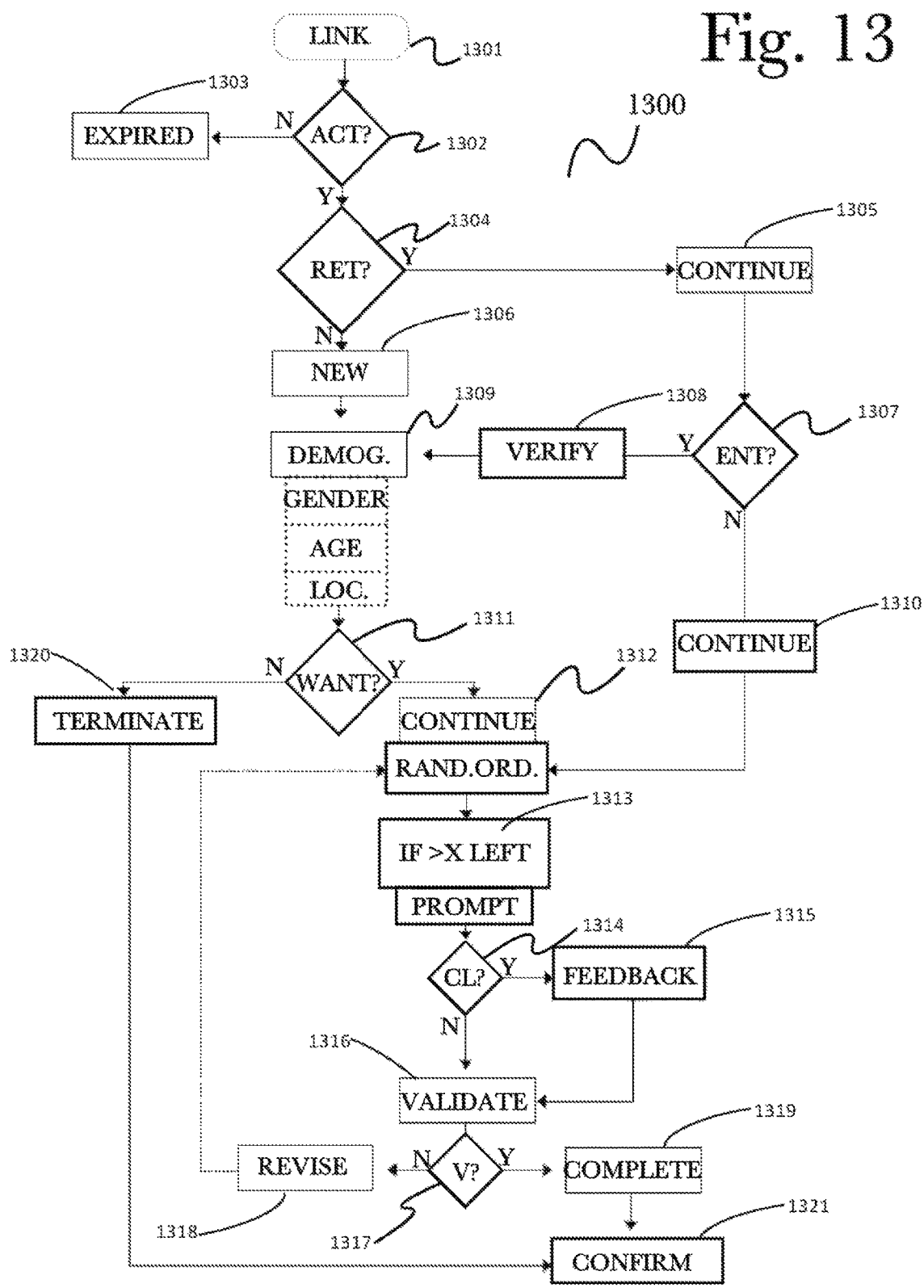
FIG. 13 shows an exemplary process for user participation in a survey, according to one aspect of the system and method disclosed herein.

FIG. 13 shows an exemplary process 1300 for user participation in a survey, according to one aspect of the system and method disclosed herein. In step 1301 the user enters the system via a unique link to a web-based application. In step 1302 the system determines whether the user is a participant in an active survey. If the user is not a participant in an active survey (No), the system moves to step 1303, where the session ends. If the user is a participant in an active survey, the system moves to step 1304, where it queries the user as to whether he wants to return to his incomplete survey (Yes) or start a new survey (No). If the user wants to start a new survey (No), the system moves to step 1309, where the user enters demographic information, such as gender, age, and location. If yes, the system moves to step 1305, where the user can continue the incomplete survey until the system moves to step 1307, where it checks to determine whether the user has entered all the survey-desired demographics. If not (No), the system moves to step 1308 where the user can verify or restate his demographics, and thence to step 1309, where he completes his demographic information entries. In step 1311 the system determines whether the user has entered the survey-desired demographics. If not (No), the system moves to step 1320, where the survey terminates, and in step 1321, the system sends the user a confirmation message. If, in step 1311, the system determines that the user has supplied all the required demographics (Yes), the system moves to step 1312, where the survey continues with various questions, for example, with 20 questions in random order that the user can vote on with however many credits he has. In step 1313, the system checks the number of remaining credits and the number of remaining questions. If both credits and questions remain, the system prompts the participant. When the survey is finished, the system determines if the participant is a client (for example, if the client is testing the survey before it is distributed to actual participants), that is, a person responsible for distributing surveys to participants, in step 1314. If the participant is a client he is prompted for feedback at step 1315. From either step 1314 or 1315, the system moves to step 1316, where it validates the submission. If, in step 1317, the system finds the submission is not valid, it moves to step 1318, where the user is advised to revise his answer, and then the system returns the user to step 1312. If, in step 1317, the system finds that the submission is valid, it moves to step 1319, where the survey is completed, and then in step 1321, the system displays to the user on the device that the survey has been successfully completed.

Figure 14:
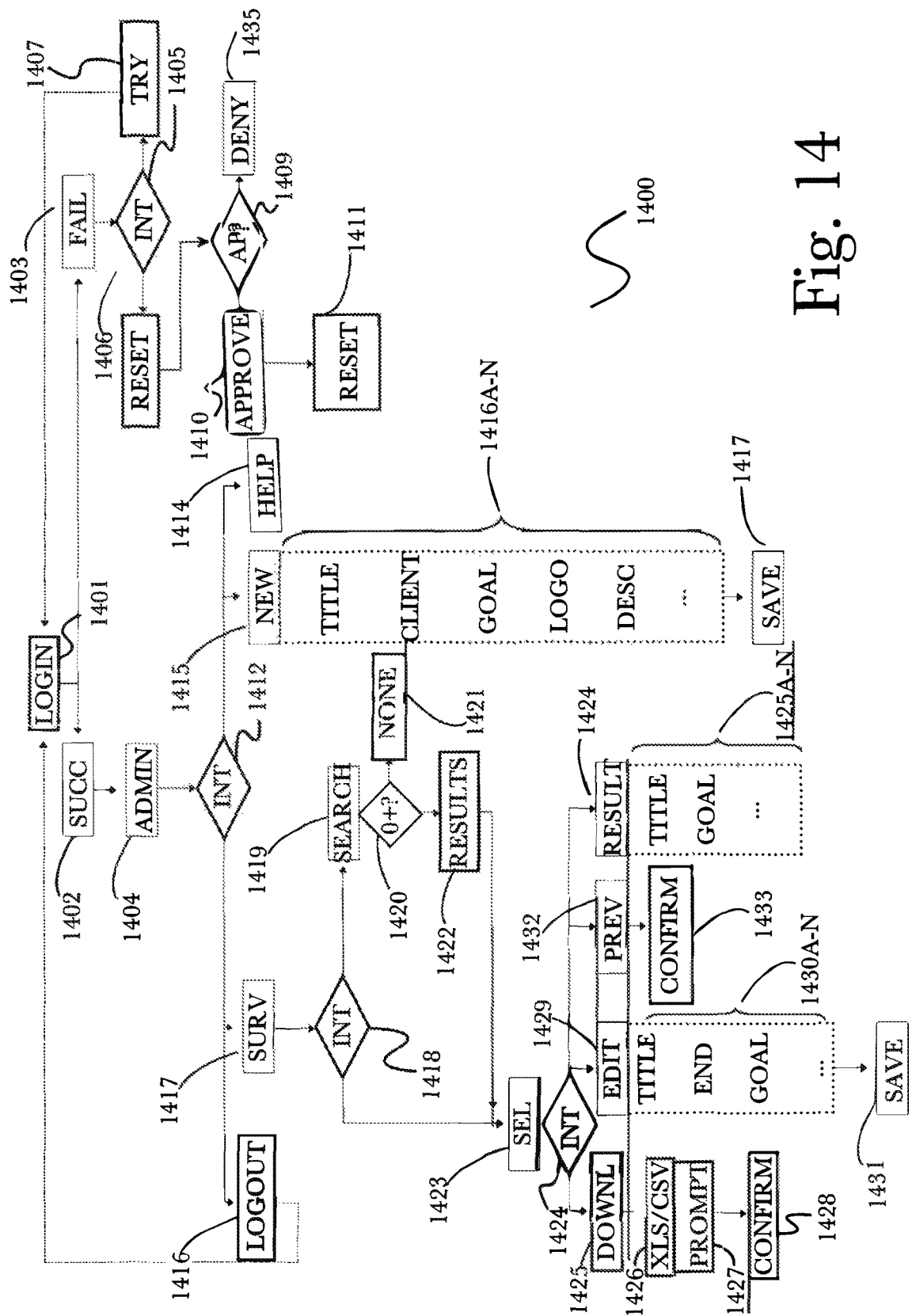
FIG. 14 shows an exemplary process for all activities in the system available to system administrators, according to one aspect of the system and method disclosed herein.

FIG. 14 shows an exemplary process 1400 for all activities in the system available to system administrators, according to one aspect of the system and method disclosed herein. In step 1401, an admin logs in to the system. If the login is not successful, the system, in step 1403, gives the admin the option to try again in step 1407 or to reset his password (1406). In step 1406, after the admin attempts to reset his password, the system sends an email to other administrators for their approval, and in step 1409, the system determines whether the password is approved. If the reset password in not approved in step 1435, the admin has no further access to the system. If the reset password is approved in step 1410, the system sends an email to the admin with a link to the reset password form. When the admin accesses the reset password form in step 1411, he enters and then confirms by reentering his new password. The admin may then return to step 1401 whenever desired.

After the system confirms a successful login in step 1402, the main admin dashboard 1404 appears on the screen. The admin may then choose, in step 1412, from among options Log out 1416, Surveys 1417, Create new survey 1415, and Help 1414. Help 1414 gives the admin the options of FAQs and an admin guide. Log out 1416 takes the admin back to the login screen 1401. When the admin selects Create new survey 1415, he then moves through the various survey components 1416*a-n*, and upon completion, he can save the survey in step 1417. If an admin selects Surveys 1417, the survey dashboard appears, where the admin may select from pending, active, or completed surveys. The admin may then, in step 1418 select a listed survey in step 1418, or search for a survey in step 1419. If the search returns no results (No) in step 1420, the system terminates at no results. If the search returns results (Yes) in step 1420, in step 1422 the results are displayed and the admin then selects a survey in step 1423, just as he does if he selects a listed survey in step 1418. After a survey is selected in 1424, in the case of a completed survey the admin may elect to download data related to the survey in step 1425, then choose a format and complete the download in steps 1426-1428. In other cases, the admin may elect to edit a survey in steps 1429-1430*n*, or send the survey for client preview in steps 1432-1433, or, last but not least, view survey results in steps 1424-1425*n*. When the admin elects to download the data he may download, for example, an .xls or .csv file at the download prompt. When the download ends, a download confirmation message appears. After electing to edit a survey, the admin may modify or delete survey elements 1430*a-n*, and when finished, the admin saves the survey in step 1431. After the admin sends a survey to a client in step 1432, he receives a transmission confirmation in step 1433. And if the admin chooses to view the survey results, he is presented with the data list 1424*a-n*.

Figure 15:
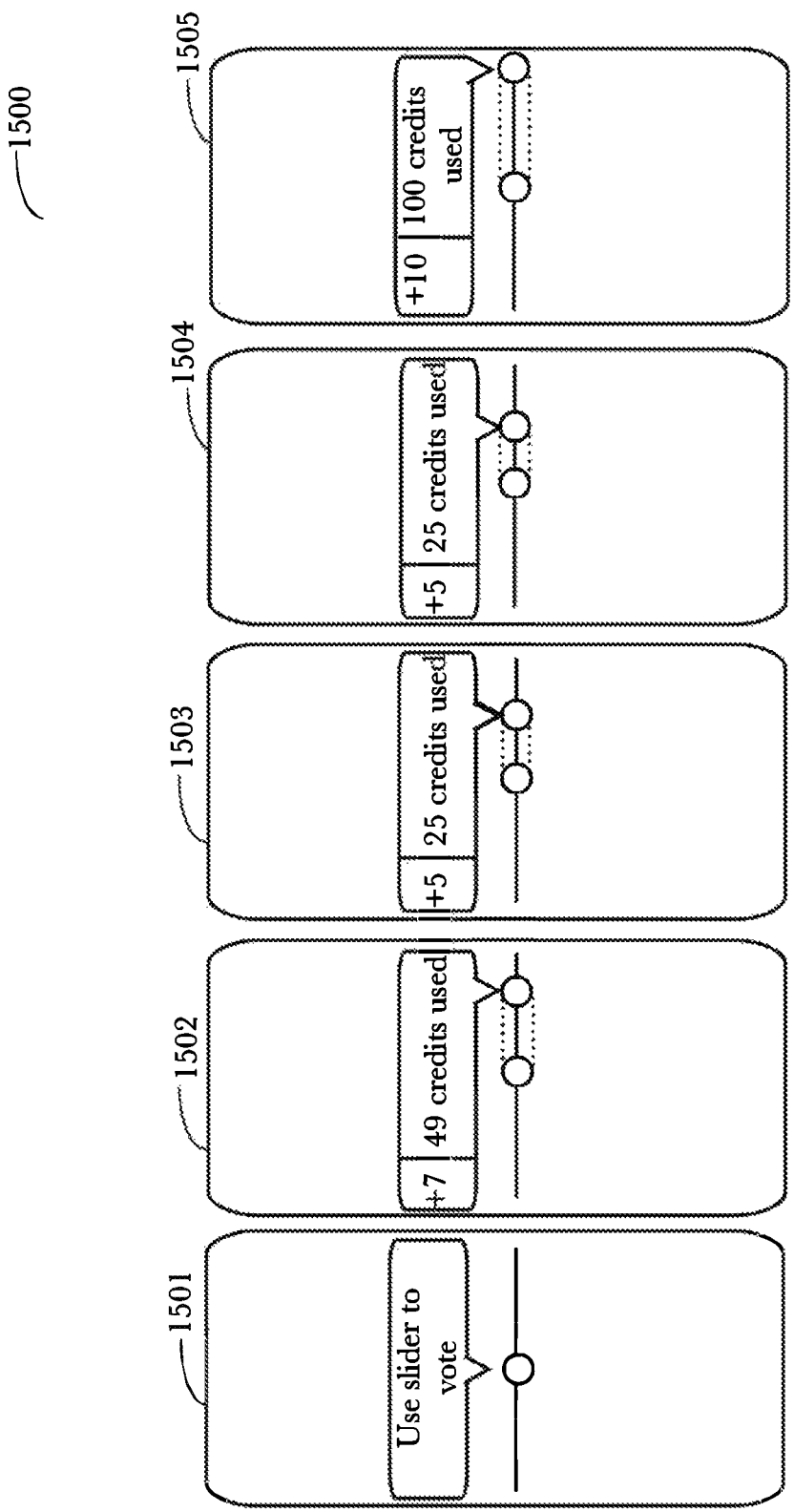
FIG. 15 shows an exemplary series of screen shots, according to one aspect of the system and method disclosed herein.

FIG. 15 shows an exemplary series of screen shots 1500, according to one aspect of the system and method disclosed herein. Screen shot 1501 shows the start of a voting session on a set of issues for which the user begins with 100 credits. The first question ("The phone will have a large screen . . . ") occupies the top portion of the screen, and the second question ("The phone will have an excellent . . . ") is below that, with its voting meter and all later questions out of view. Vertical scrolling reveals the out-of-view items. In shot 1502 the voter has moved the vote slider to plus seven votes. Note that in this voting session, the voter may also move the slider into negative territory, giving votes against an issue. By moving the slider to plus 7, the voter expends 49 voting credits, as shown in the top right corner, and is left with 51 voting credits, as shown in the left corner in the circle. In shot 1503, the voter has changed his vote, moving the slider back to only 5 votes. Since this vote should require only $25=5^2$ units of the voting currency, the user gains back currency (as indicated by the green color). This leaves the user with $100-25=75$ units of currency (shown in the top left). Note that in screens 1501 and 1502, the number of voting credits expended equals the square of the number of votes cast. In shot 1504, the voter has confirmed his vote and credits expended. Shot 1505 shows an example of all votes (10) cast and all voting credits ($10^2=100$) expended. In addition, as the user casts more votes, the color of the rubber band around the slider endpoints changes from brown to white, as a real rubber band does when stretching. This gives a cognitive-kinesthetic aid to the quadratic nature of the voting. This quadratic feel is also embodied in the Voting credits scale at the top of the screen: as the user pulls linearly on the votes slider, the voting credits scale decreases quadratically in real time. Note that while this software representation utilizes particular instantiations of the QV methodology, it is meant to apply to other QV (near-QV, and CV) instantiations (e.g., those outlined in FIGS. 4-8), as well as others that use the mathematics of QV without incorporating kinesthetic, auditory, visual, and/or metaphorical elements (e.g., simply pressing buttons that increase/decrease the vote by one each time).

FIG. 16 shows an exemplary screen 1600 in which an administrator has an overview of the status of existing surveys and from which an administrator can create surveys, according to one aspect of the system and method disclosed herein. In activity selection bar 1601, the administrator can elect to view the survey dashboard, create a survey, view system Help, or log out of the system. In this example, the Dashboard tab is highlighted, indicating that the administrator is viewing the existing surveys dashboard 1602. In dashboard 1602, the administrator can choose from active, pending, or completed surveys, or search for a survey. Column header row 1603 identifies the data shown in the columns of rows 1604*a-n*. In rows 1604*a-n* various pending surveys are listed with, left to right, survey ID number, titles, number of completed votes, and survey end date. Under the Actions column head, the administrator may choose, left to right, to preview, deploy, or edit a survey. As shown in later figures, each survey has a target number of voters. The Complete Votes column shows the number of voters who have, so far, finished voting. That is, how close to the target number of voters.

FIG. 17 shows an exemplary administrative screen 1700, according to one aspect of the system and method disclosed herein. Screen 1700 is similar to screen 1600, with the exception that row 1704*b* shows information about the survey listed directly above it, in row 1704*a*. The administrator displays row 1704*b* by clicking on circled symbol 1705 at the far left of the row. When the survey details appear in row 1704*b*, circled symbol 1705 turns from a plus sign (+) to a minus sign (−).

Figure 18:
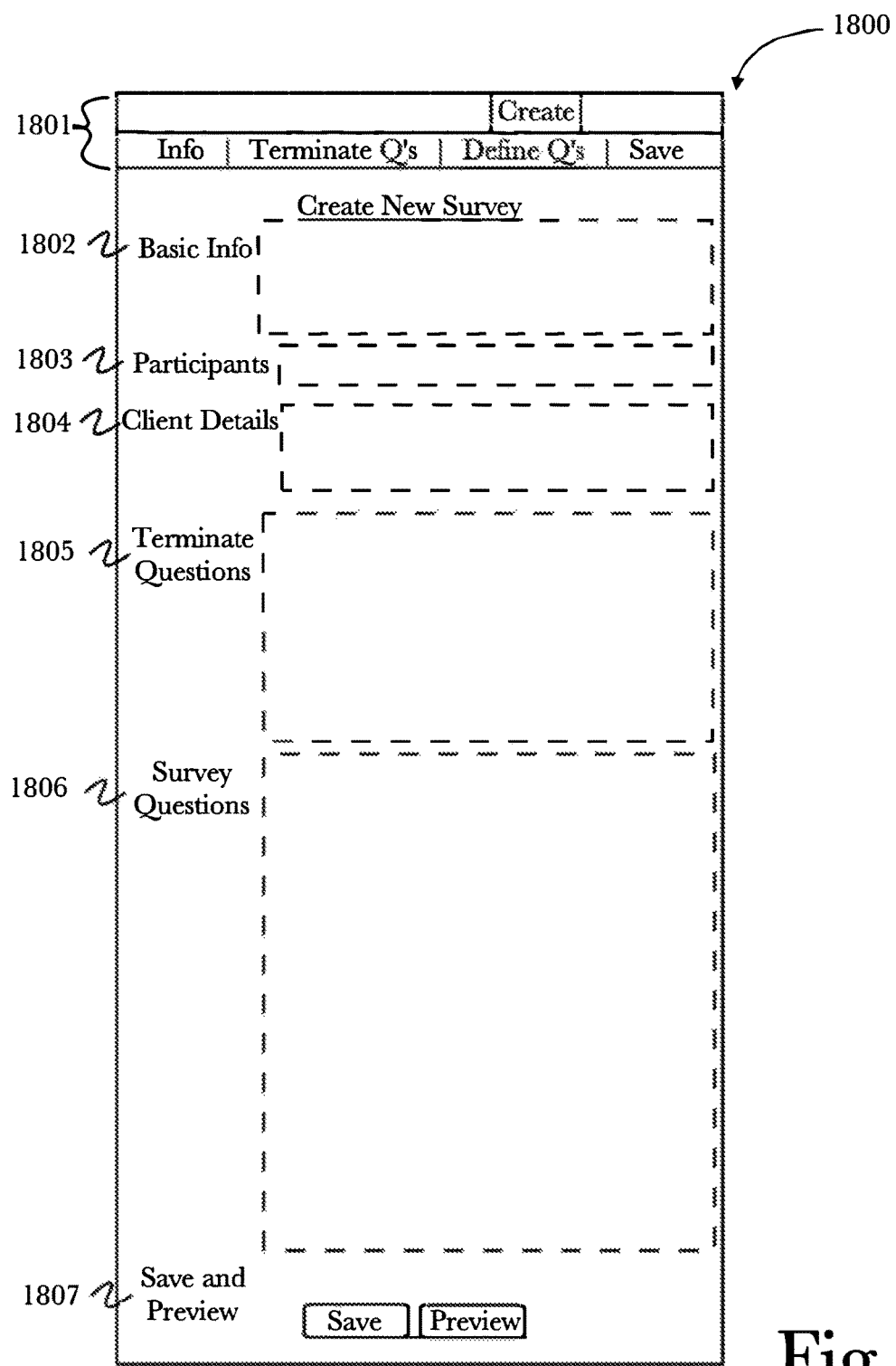
FIG. 18 shows an exemplary administrative screen for creating a new survey, according to one aspect of the system and method disclosed herein.

FIG. 18 shows an exemplary administrative screen 1800 for creating a new survey, according to one aspect of the system and method disclosed herein. In this example, the Create Survey tab is highlighted in activity selection bar 1801, indicating that the administrator has elected to display the screen for creating a new survey. In basic information section 1802, the administrator fills in the title, start data, end data, and vote goal. He may then elect whether or not to randomize survey questions and provide an open comments section. In section 1803, the administrator sets the deployment options—such as the number of max participants, days to complete survey, etc.—and allots the number of voting credit options per voter. In section 1804, the administrator enters client information, and in section 1805 one or more terminate questions may be enabled and details entered. A "terminate question" is a standard question that defines the people who will be completing the full survey. For example, if a client only wants to interview men between the ages of 18-34 who own a smartphone, there will be three terminate questions: gender, age, and ownership of a smartphone. These precede the actual QV proposals where the participants who pass the terminate questions will be allocating their credits. In section 1806 the administrator enters survey questions, with various options for each question. This exemplary screen shows three question forms, with the option to add more questions. In section 1807 the administrator may add terms and conditions and preview or save the survey.

Figure 19:
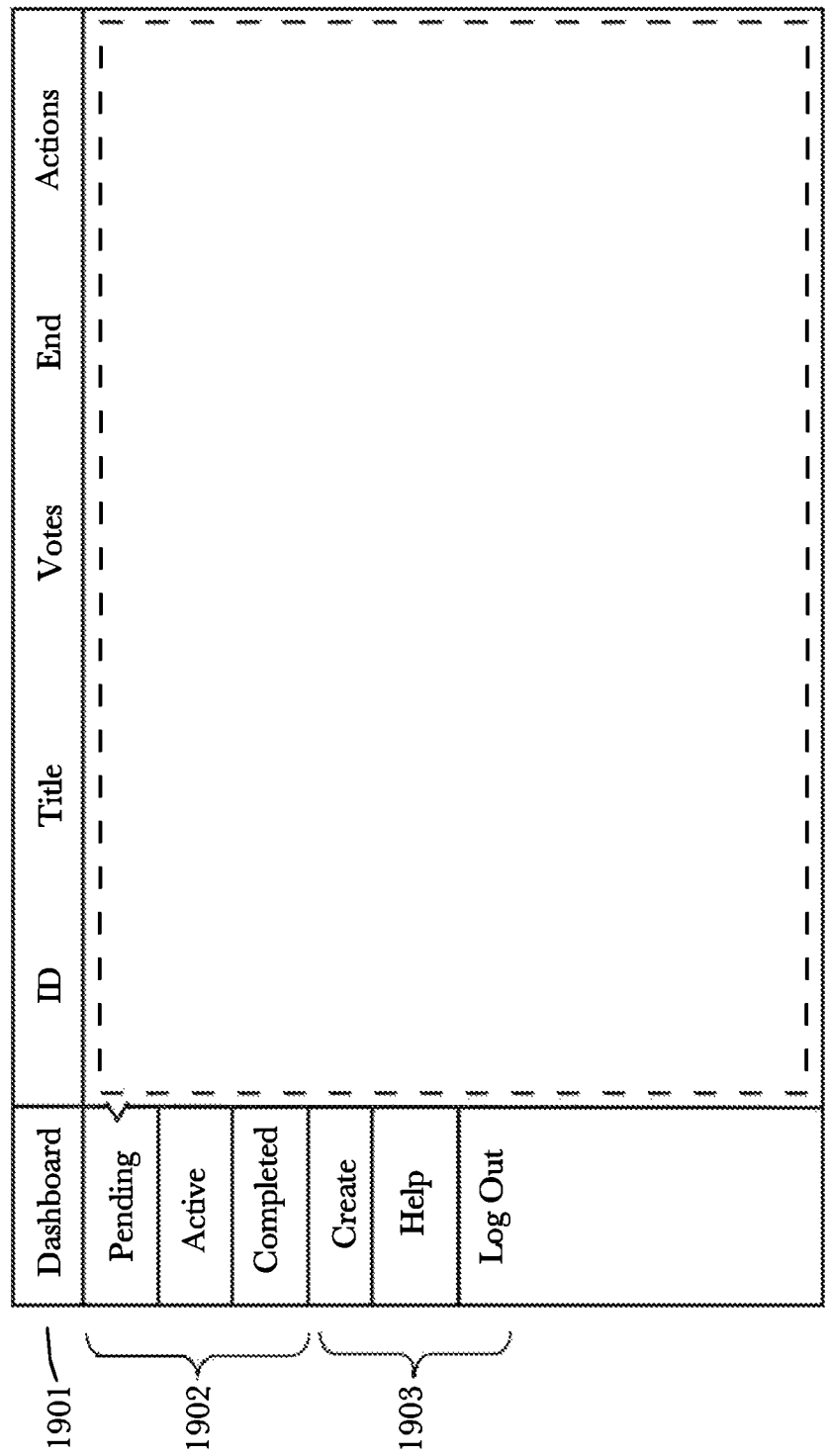
FIG. 19 shows an exemplary administration screen, according to one aspect of the system and method disclosed herein.

FIG. 19 shows an exemplary administration screen 1900, according to one aspect of the system and method disclosed herein. The elements of FIG. 19 are identical to those of FIG. 16, with the exception of the activity selection bar sections 1901 and 1903 and dashboard 1902. While these two elements offer the same functions as activity selection bar 1601 and dashboard 1602, they are now arrayed on the side of the main part of the screen, rather than at the top.

Figure 20:
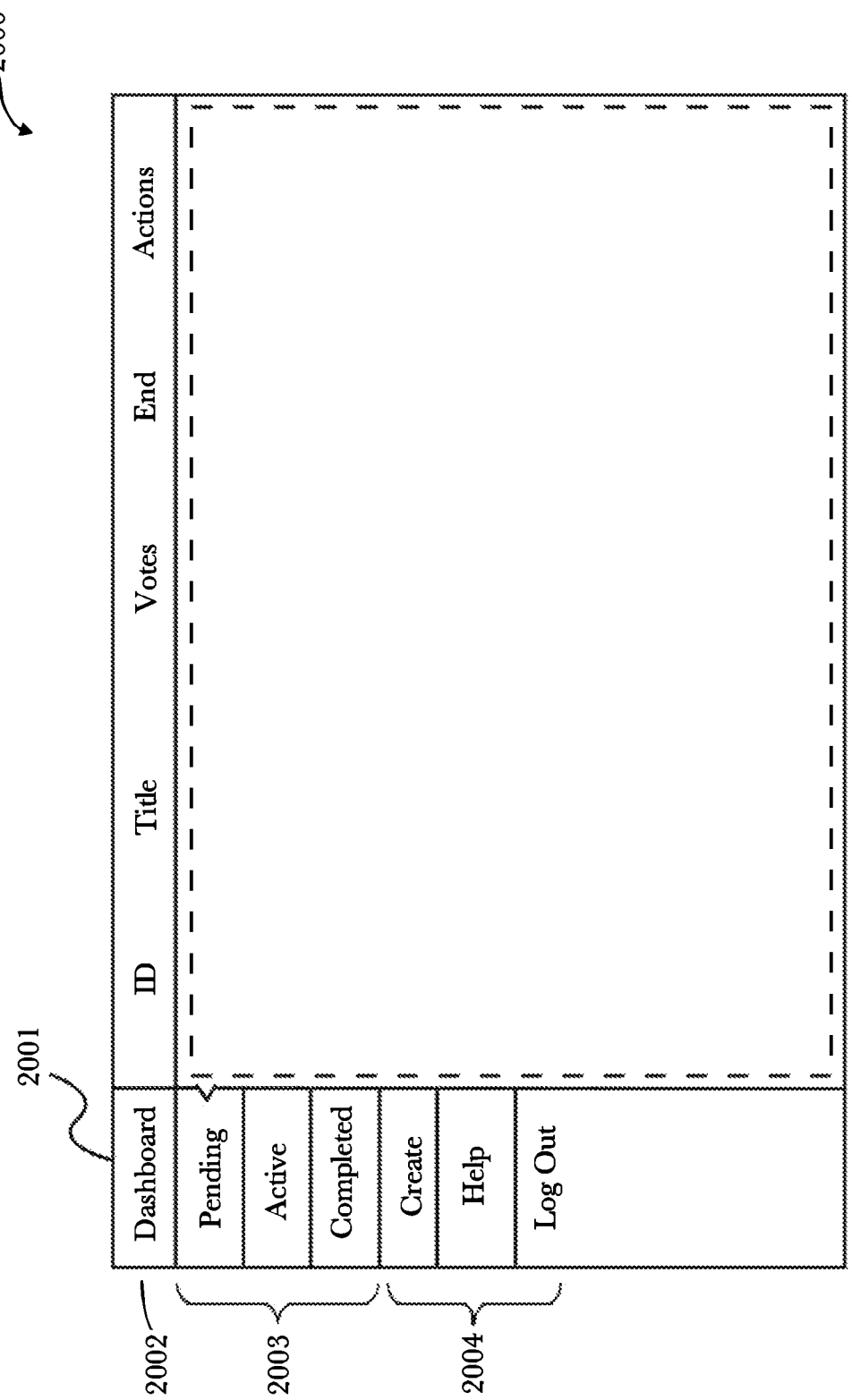
FIG. 20 shows an exemplary administrative screen, according to one aspect of the system and method disclosed herein.

FIG. 20 shows an exemplary administrative screen 2000, according to one aspect of the system and method disclosed herein. The elements of FIG. 20 are identical to those of FIG. 17, with the exception of the activity selection bar sections 2001 and 2003, and dashboard 2002. While these two elements offer the same functions as activity selection bar 1701 and dashboard 1702, they are now arrayed on the side of the main part of the screen, rather than at the top.

Figure 21:
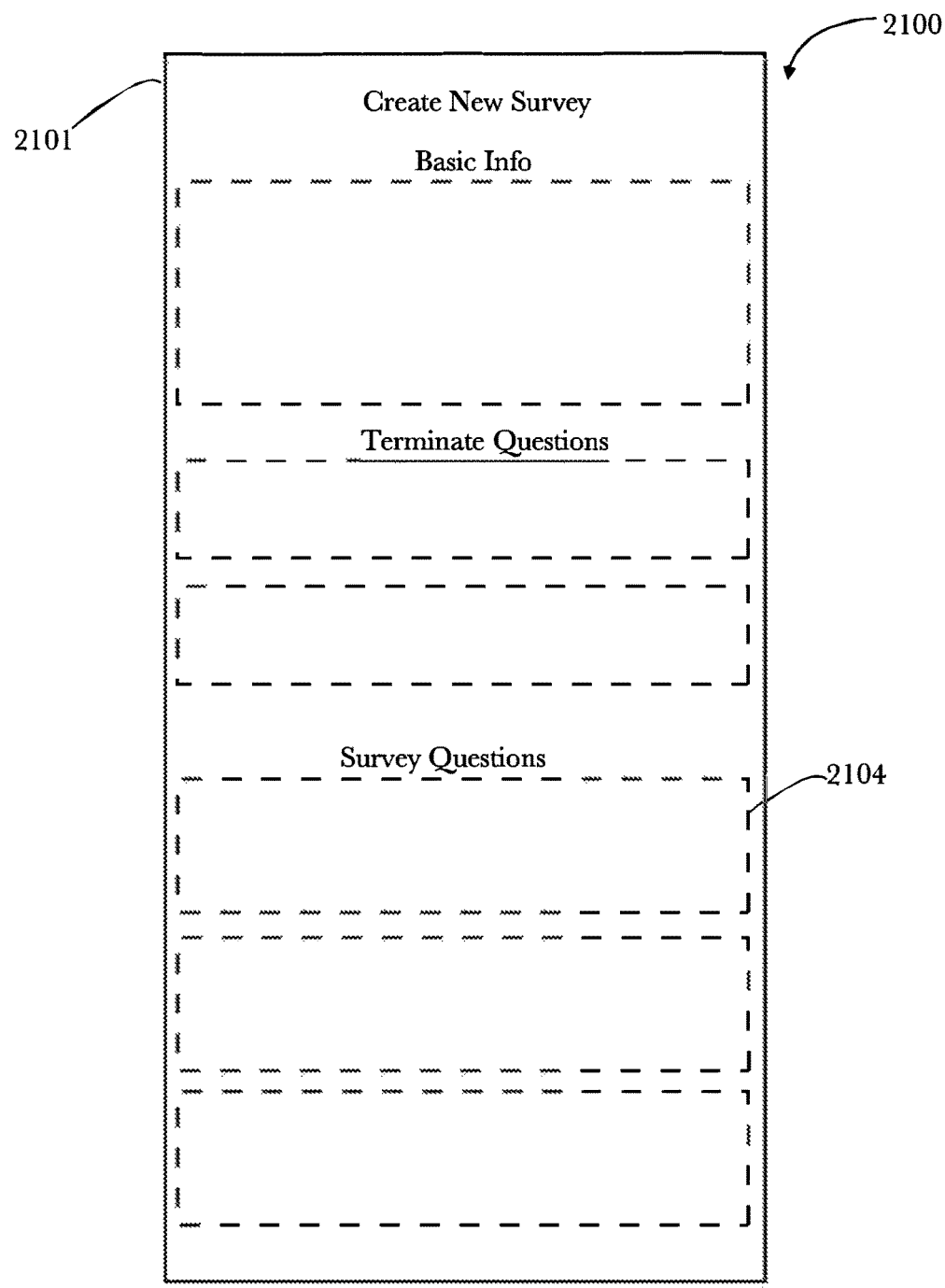
FIG. 21 shows an exemplary administrative screen for creating a new survey, according to one aspect of the system and method disclosed herein.

FIG. 21 shows an exemplary administrative screen 2100 for creating a new survey, according to one aspect of the system and method disclosed herein. The elements of FIG. 21 are identical to those of FIG. 18, with the exception of the activity selection bar 2101, which although it offers the same functions as activity selection bar 1801, is now arrayed on the side of the main part of the screen, rather than at the top.

Figure 25:
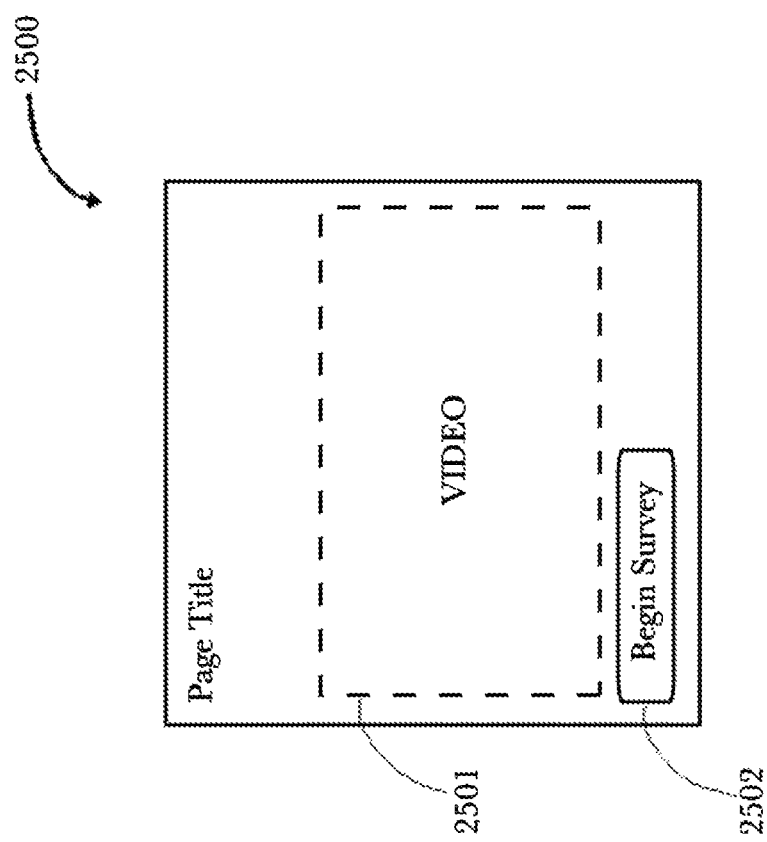
FIG. 25 shows an exemplary screen of an option (typically an option controlled by the publisher or owner of the survey) that can require a voter to preview a video before voting, according to one aspect of the system and method disclosed herein.

FIG. 25 shows an exemplary screen 2500 of an option (typically an option controlled by the publisher or owner of the survey) that can require a voter to preview a video before voting, according to one aspect of the system and method disclosed herein. Only after viewing video 2501 and clicking button 2502 can the user continue on to vote. Once the button is pressed, the voter has access to the voting system shown in FIGS. 26*a-e*.

Figure 26:
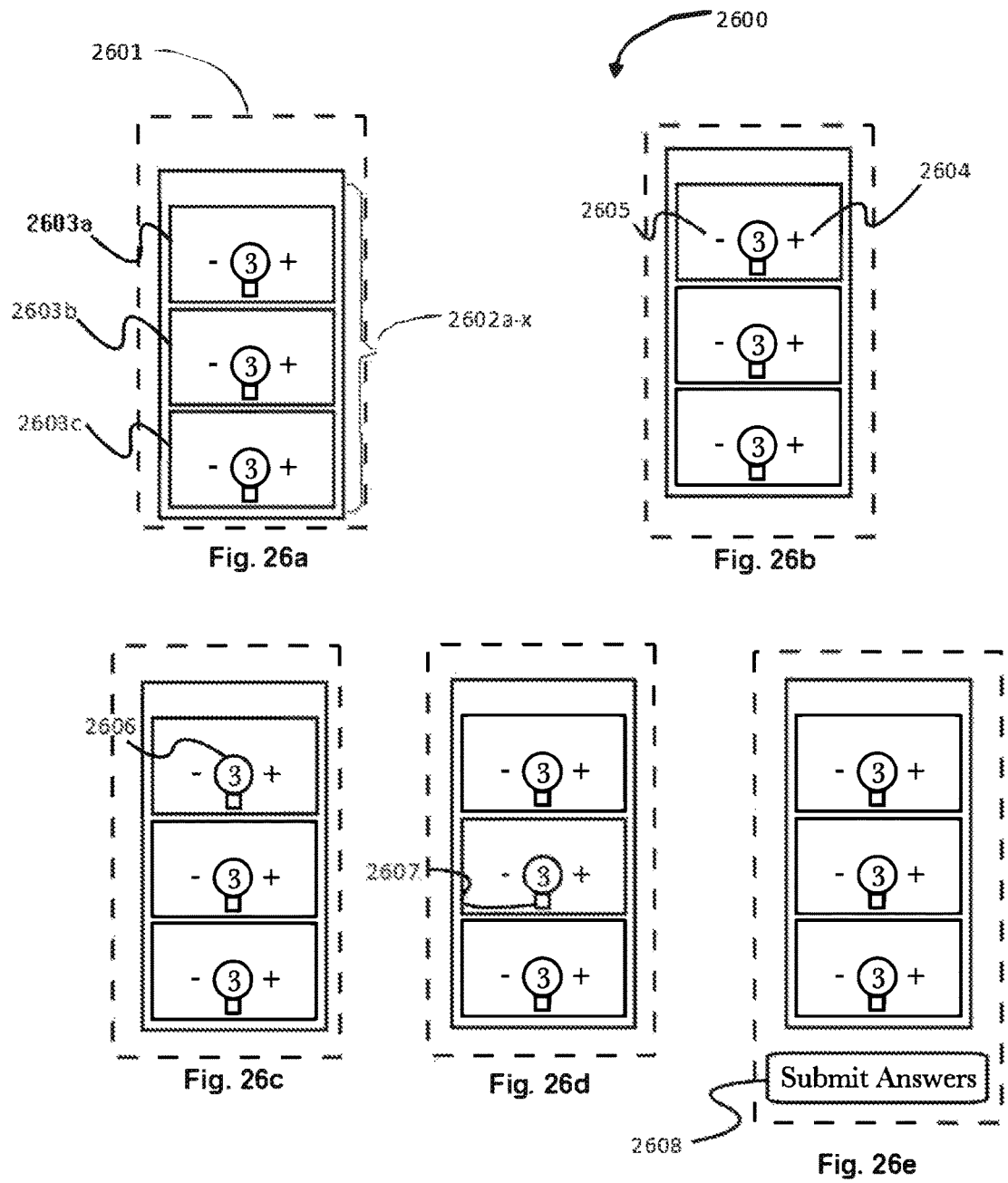

FIGS. 26*a-e* show exemplary voting windows, according to one aspect of the system and method disclosed herein. FIG. 26*a* shows exemplary voting blocks 2601*a-c* and also progress bar 2602, wherein the number of credits remaining to the voter are shown. The voter can click up arrow 2604 and down arrow 2605 in each block, as shown in FIG. 26*b*, to add or remove votes. The number of votes currently allotted in each block are shown in exemplary circle 2606, as shown in FIG. 26*c*. The number of credits remaining to the voter appear in exemplary box 2607, as shown in FIG. 26*d*. In these examples, a screen may any number of voting blocks, accessible to the voter by scrolling down. Beneath the last block in the set of voting blocks is button 2608, as shown in FIG. 26*e*, which the voter clicks to submit his votes.

FIG. 27 shows an exemplary voting screen 2700 in greater detail, according to one aspect of the system and method disclosed herein. Voting blocks 2703*c*, 2704*c*, and 2705*c* appear in screen 2700. At the top of the screen is progress bar 2702, which shows the number of remaining credits 2701. This progress bar moves simultaneously with the increment or decrement of votes, controlled shown in the up and down thumb buttons. In each block, the number of votes used 2703*a*, 2704*a*, and 2405*a* appears, as does the related number credits used 2703*b*, 2704*b*, and 2705*b*, respectively. The cost of vote credits increases quadratically in real time as the voter gives more votes to an issue. Thus, the more strongly a voter feels about an issue, the higher the cost in credits. Therefore, if a voter has, for example, ten issues on which to vote, he cannot give a high number of votes to all the issues. The voter must, in effective, rank the importance of the issues and decide on which issue(s) he should expend the greatest number of credits.

The system may record all actions taken by the user. For example, it may record every time the user presses one of vote increment or decrement pressure regions. It may also record aspects of scrolling behavior, such as the amount of time a user spends statically on each part of the screen. These data may be recorded by the system as described above for analytic purposes, such as determining the typical path of behavior through the survey taken by various users and how this predicts eventually survey decisions.

In addition to the environments described above, the system may include additional questions in a more standard survey format. For example, these questions may ask respondents to navigate to another website or to provide their email address for additional information regarding questions queried on the survey.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure may be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Further, this system may be used by third parties to create a QV marketing survey and to obtain reports on the survey results. Additionally, an online market research service may offer to participants real or virtual money as voting currency, for use in one or multiple surveys, with the virtual money, in some cases, having actual value to that it may be redeemed, for example, for air miles, and the remaining credits may be raffled to the participants. The skilled person will be aware of a range of possible modifications of the various embodiments described above. Accordingly, the present invention is defined by the claims and their equivalents.

The skilled person will be aware of a range of possible modifications of the various embodiments described above. Accordingly, the present invention is defined by the claims and their equivalents.

What is claimed is:

1. A system for eliciting and aggregating the truthful preferences of a group of respondents, comprising:
   a server computer comprising a memory, a processor, and a plurality of programming instructions stored in the memory and operating on the processor, the plurality of programming instructions comprising at least a quadratic voting software component configured to:
   provide an administrative user interface for assigning a budget of artificial or real currency to a first respondent of the group of respondents;
   provide a respondent user interface that:
   displays a set of choices among alternative outcomes for the first respondent and a method for allocating votes among the choices by paying with the budget according to a quadratic function; and
   displays an outcome of the voting for the first respondent;
   enable a third party to select a subset of the plurality of respondents and to contact the subset of respondents by email or text message with a link to a web page;
   enable the third party to observe voting choices made by respondents and final voting outcomes; and
   enable the third party to act via the administrative user interface.

2. The system of claim 1, wherein a near-quadratic or convex cost of voting may be used, where:
   a near-quadratic cost of voting is a Taylor polynomial of a cost-vote relationship with small coefficients on all degree 3 and higher terms, and
   a convex cost of voting is a cost with a linear or close to linear derivative.

3. The system of claim 2, wherein the quadratic-voting software component is further configured to:
   record every click that the first respondent makes while allocating currency to votes and revising decisions;
   generate aggregate statistics using the recorded click data; and
   reveal a set of choices that receive the most deliberation, and a strength of preference for various choices.

4. The system of claim 2, wherein the respondent user interface comprises one or more of:
   a visual depiction of a device such as a slider, knob, spring, or cord, which may be moved by touching a screen, wherein the device exhibits greater resistance according to a quadratic function as a user uses it to register a greater number of votes;
   an acoustic component that emits a noise an acoustic volume of which varies according to a quadratic function as a greater number of votes are registered by the user; and
   a visual depiction of a funnel, wherein a volume of liquid within the funnel represents units of currency and a height of a visual liquid level in the funnel represents a number of votes, wherein the funnel is shaped so that a quadratic relationship between votes cast and currency units is maintained.

5. The system of claim 4, wherein the quadratic-voting software component is further configured to:
   generate a user interface that:
   enables the first respondent to communicate a proposal to other respondents by placing currency in an escrow account; and
   allows other respondents to endorse the proposal by placing currency in the escrow account; and
   adds the proposal as an alternative option to be voted on by respondents if currency placed in escrow exceeds a threshold level.

6. A method for eliciting and aggregating the truthful preferences of a group of respondents, the method comprising the steps of:
   assigning, using a quadratic voting software component comprising programming instructions stored in a memory of, and operating on a processor of, a server computer comprising a memory and a processor, a budget of artificial or real currency to a respondent of the group of respondents; and
   providing, using the quadratic voting software component, an administrative user interface for assigning a budget of artificial or real currency to a first respondent of the group of respondents;
   providing, using the quadratic voting software component, a respondent user interface that:

displays a set of choices among alternative outcomes for the first respondent and a method for allocating votes among the choices by paying with the budget according to a quadratic function; and displays an outcome of the voting for the first respondent;

enabling, using the quadratic voting software component, a third party to select a subset of the plurality of respondents and to contact the subset of respondents by email or text message with a link to a web page;

enabling, using the quadratic voting software component, the third party to observe voting choices made by respondents and final voting outcomes; and enabling, using the quadratic voting software component, the third party to act via the administrative user interface.

7. The method of claim 6, wherein a near-quadratic or convex cost of voting may be used, where:

a near-quadratic cost of voting is a Taylor polynomial of a cost-vote relationship with small coefficients on all degree 3 and higher terms, and a convex cost of voting is a cost with a linear or close to linear derivative.

8. The method of claim 7, wherein the method further comprises the steps of:

recording every click that the first respondent makes while allocating currency to votes and revising decisions;

generating aggregate statistics using the recorded click data; and revealing a set of choices that receive the most deliberation and a strength of preference for various choices.

9. The method of claim 7, wherein the respondent user interface comprises one or more of:

a visual depiction of a device such as a slider, knob, spring, or cord, which may be moved by touching a screen, wherein the device exhibits greater resistance according to a quadratic function as a user uses it to register a greater number of votes;

an acoustic component that emits a noise an acoustic volume of which varies according to a quadratic function as a greater number of votes are registered by the user; and a visual depiction of a funnel, wherein a volume of liquid within the funnel represents units of currency and a height of a visual liquid level in the funnel represents a number of votes, wherein the funnel is shaped so that a quadratic relationship between votes cast and currency units is maintained.

10. The method of claim 9, wherein the quadratic-voting software component is further configured to:

generate a user interface that:

enables the first respondent to communicate a proposal to other respondents by placing currency in an escrow account; and allows other respondents to endorse the proposal by placing currency in the escrow account; and adds the proposal as an alternative option to be voted on by respondents if currency placed in escrow exceeds a threshold level.

\* \* \* \* \*